(12) United States Patent
Schubert et al.

(10) Patent No.: US 10,957,907 B2
(45) Date of Patent: Mar. 23, 2021

(54) USE OF CERTAIN POLYMERS AS A CHARGE STORE

(71) Applicant: Evonik Operations GmbH, Essen (DE)

(72) Inventors: Ulrich Schubert, Jena (DE); Andreas Wild, Haltern am See (DE); Bernhard Haeupler, Hof (DE)

(73) Assignee: Evonik Operations GmbH, Essen (DE)

(*) Notice: Subject to any disclaimer, the term of this patent is extended or adjusted under 35 U.S.C. 154(b) by 587 days.

(21) Appl. No.: 15/568,884

(22) PCT Filed: Aug. 8, 2016

(86) PCT No.: PCT/EP2016/068865
§ 371 (c)(1),
(2) Date: Oct. 24, 2017

(87) PCT Pub. No.: WO2017/032583
PCT Pub. Date: Mar. 2, 2017

(65) Prior Publication Data
US 2018/0108911 A1    Apr. 19, 2018

(30) Foreign Application Priority Data

Aug. 26, 2015 (EP) .................................... 15182449

(51) Int. Cl.
*H01M 4/60* (2006.01)
*C08F 12/22* (2006.01)
(Continued)

(52) U.S. Cl.
CPC ............. *H01M 4/606* (2013.01); *C08F 12/22* (2013.01); *C08F 12/32* (2013.01); *C08F 12/34* (2013.01); *C09D 125/18* (2013.01)

(58) Field of Classification Search
CPC ......... H01M 4/606; C08F 12/22; C08F 12/32; C08F 12/34; C09D 125/18
(Continued)

(56) References Cited

U.S. PATENT DOCUMENTS 2,739,160 A    3/1956 Bell et al.
4,999,263 A    3/1991 Kabata et al.
(Continued)

FOREIGN PATENT DOCUMENTS

CN    101401234 A    4/2009
CN    101612198 A    1/2010
(Continued)

OTHER PUBLICATIONS

Kamagawa et al., "Syntheses of Polymerizable Hydroquinone Derivatives" (J. Polym. Sci., Polym. Chem. Ed., vol. 14, p. 1235-1240, (1976)). (Year: 1976).*
(Continued)

*Primary Examiner* — Ling Siu Choi
*Assistant Examiner* — Ronald Grinsted
(74) *Attorney, Agent, or Firm* — Oblon, McClelland, Maier & Neustadt, L.L.P.

(57) ABSTRACT

The present invention relates to polymers and to the use thereof in the form of active electrode material or in an electrode slurry as electrical charge storage means, the electrical charge storage means especially being secondary batteries. These secondary batteries are especially notable for high cell voltages, and simple and scalable processing and production methods (for example by means of screen printing).

10 Claims, 3 Drawing Sheets

(51) Int. Cl.
*C08F 12/32* (2006.01)
*C08F 12/34* (2006.01)
*C09D 125/18* (2006.01)

(58) Field of Classification Search
USPC .......................................................... 429/213
See application file for complete search history.

(56) References Cited

U.S. PATENT DOCUMENTS

| | | | |
|---|---|---|---|
| 5,817,887 | A | 10/1998 | Leppard et al. |
| 6,395,429 | B1 | 5/2002 | Kang et al. |
| 6,924,067 | B1 | 8/2005 | Ito et al. |
| 2002/0034690 | A1 | 3/2002 | Ono |
| 2002/0041995 | A1 | 4/2002 | Bannai et al. |
| 2002/0041996 | A1 | 4/2002 | Morioka et al. |
| 2003/0062080 | A1 | 4/2003 | Satoh et al. |
| 2003/0096165 | A1 | 5/2003 | Nakahara et al. |
| 2005/0164063 | A1 | 7/2005 | Wariishi et al. |
| 2005/0170247 | A1 | 8/2005 | Nakahara et al. |
| 2005/0260500 | A1 | 11/2005 | Iwasa et al. |
| 2007/0027302 | A1 | 2/2007 | Nakamura et al. |
| 2008/0269360 | A1 | 10/2008 | Itoh et al. |
| 2009/0161295 | A1 | 6/2009 | Kuroda et al. |
| 2010/0167129 | A1 | 7/2010 | Wu et al. |
| 2010/0233537 | A1 | 9/2010 | Nesvadba et al. |
| 2010/0255372 | A1 | 10/2010 | Suguro et al. |
| 2011/0006294 | A1 | 1/2011 | Tanaka et al. |
| 2011/0020710 | A1 | 1/2011 | Iwayasu |
| 2011/0129730 | A1 | 6/2011 | Kasai et al. |
| 2012/0095179 | A1 | 4/2012 | Nishide et al. |
| 2012/0100437 | A1 | 4/2012 | Nakahara et al. |
| 2012/0171561 | A1 | 7/2012 | Iwasa et al. |
| 2012/0187387 | A1 | 7/2012 | Sekiguchi et al. |
| 2012/0189919 | A1 | 7/2012 | Abe et al. |
| 2013/0183782 | A1 | 7/2013 | Mima |
| 2013/0189571 | A1 | 7/2013 | Abouimrane et al. |
| 2013/0209878 | A1 | 8/2013 | Nakahara et al. |
| 2013/0224538 | A1 | 8/2013 | Jansen et al. |
| 2013/0288137 | A1 | 10/2013 | Weng et al. |
| 2014/0038036 | A1 | 2/2014 | Nishide et al. |
| 2014/0048786 | A1 | 2/2014 | Suzuka et al. |
| 2014/0057167 | A1 | 2/2014 | Kasai et al. |
| 2014/0061532 | A1 | 3/2014 | Nishide et al. |
| 2014/0079984 | A1 | 3/2014 | Kajitani et al. |
| 2014/0087235 | A1 | 3/2014 | Kajitani et al. |
| 2015/0025213 | A1 | 1/2015 | Yasumatsu et al. |

FOREIGN PATENT DOCUMENTS

| | | |
|---|---|---|
| CN | 102651486 A | 8/2012 |
| CN | 102683744 A | 9/2012 |
| DE | 231 455 A1 | 12/1985 |
| DE | 195 32 574 A1 | 3/1997 |
| EP | 0 167 321 A1 | 1/1986 |
| EP | 0 420 699 A2 | 4/1991 |
| EP | 1 128 453 A2 | 8/2001 |
| GB | 1 454 336 A | 11/1976 |
| JP | 49-117598 A | 11/1974 |
| JP | 3-128931 A | 5/1991 |
| JP | 7-109351 A | 4/1995 |
| JP | 11-323094 A | 11/1999 |
| JP | 2000-30530 A | 1/2000 |
| JP | 2000-77095 A | 3/2000 |
| JP | 2001-338527 A | 12/2001 |
| JP | 2002-117852 A | 4/2002 |
| JP | 2002-117854 A | 4/2002 |
| JP | 2002-117855 A | 4/2002 |
| JP | 2002-226513 A | 8/2002 |
| JP | 2002-298850 A | 10/2002 |
| JP | 2002-313344 A | 10/2002 |
| JP | 2002-319314 A | 10/2002 |
| JP | 2003-243026 A | 8/2003 |
| JP | 2003-272701 A | 9/2003 |
| JP | 2003-277442 A | 10/2003 |
| JP | 2004-63114 A | 2/2004 |
| JP | 2004-179169 A | 6/2004 |
| JP | 2004-200059 A | 7/2004 |
| JP | 2004-259618 A | 9/2004 |
| JP | 2004-263153 A | 9/2004 |
| JP | 2004-331537 A | 11/2004 |
| JP | 2005-8689 A | 1/2005 |
| JP | 2005-11562 A | 1/2005 |
| JP | 2006-152290 A | 6/2006 |
| JP | 2006-236837 A | 9/2006 |
| JP | 2006-344504 A | 12/2006 |
| JP | 2007-123171 A | 5/2007 |
| JP | 2007-236142 A | 9/2007 |
| JP | 2008-166199 A | 7/2008 |
| JP | 2008-218326 A | 9/2008 |
| JP | 2008-234909 A | 10/2008 |
| JP | 2008-296436 A | 12/2008 |
| JP | 2009-205918 A | 9/2009 |
| JP | 2009-217992 A | 9/2009 |
| JP | 2009-230951 A | 10/2009 |
| JP | 2009-238612 A | 10/2009 |
| JP | 2009-298873 A | 12/2009 |
| JP | 2010-55923 A | 3/2010 |
| JP | 2010-77303 A | 4/2010 |
| JP | 2010-114042 A | 5/2010 |
| JP | 2010-163551 A | 7/2010 |
| JP | 2010-212152 A | 9/2010 |
| JP | 2010-238403 A | 10/2010 |
| JP | 2010-266556 A | 11/2010 |
| JP | 2010-282154 A | 12/2010 |
| JP | 2011-40311 A | 2/2011 |
| JP | 2011-74317 A | 4/2011 |
| JP | 2011-138037 A | 7/2011 |
| JP | 2011-165433 A | 8/2011 |
| JP | 2011-231153 A | 11/2011 |
| JP | 2011-252106 A | 12/2011 |
| JP | 2012-79639 A | 4/2012 |
| JP | 2012-190545 A | 10/2012 |
| JP | 2012-219109 A | 11/2012 |
| JP | 2012-221574 A | 11/2012 |
| JP | 2012-221575 A | 11/2012 |
| JP | 2012-224758 A | 11/2012 |
| JP | 2013-98217 A | 5/2013 |
| WO | WO 2004/058679 A2 | 7/2004 |
| WO | WO 2004/077593 A1 | 9/2004 |
| WO | WO 2004/098745 A1 | 11/2004 |
| WO | WO 2007/141913 A1 | 12/2007 |
| WO | WO 2008/099557 A1 | 8/2008 |
| WO | WO 2009/038125 A1 | 3/2009 |
| WO | WO 2009/145225 A1 | 12/2009 |
| WO | WO 2010/002002 A1 | 1/2010 |
| WO | WO 2010/104002 A1 | 9/2010 |
| WO | WO 2010/140512 A1 | 12/2010 |
| WO | WO 2011/034117 A1 | 3/2011 |
| WO | WO 2011/068217 A1 | 6/2011 |
| WO | WO 2011/149970 A2 | 12/2011 |
| WO | WO 2012/029556 A1 | 3/2012 |
| WO | WO 2012/120929 A1 | 9/2012 |
| WO | WO 2012/133202 A1 | 10/2012 |
| WO | WO 2012/133204 A1 | 10/2012 |
| WO | WO 2012/153865 A1 | 11/2012 |
| WO | WO 2012/153866 A1 | 11/2012 |
| WO | WO 2013/099567 A1 | 7/2013 |
| WO | WO 2014/025411 A1 | 2/2014 |

OTHER PUBLICATIONS

SigmaAldrich—Reference: Polymer Properties—Viscosity (www.sigmaaldrich.com/content/dam/sigma-aldrich/docs/Aldrich/General_information/viscosity.pdf) (Year: 2011).*

International Search Report dated Sep. 15, 2016 in PCT/EP2016/068865 filed Aug. 8, 2016.

Peter Nesvadba et al., "Synthesis of a polymeric 2,5-di-t-butyl-1,4-dialkoxybenzene and its evaluation as a novel cathode material", Synthetic Metals, Nov. 18, 2010, vol. 161, No. 3, pp. 259-262, XP028151505.

Wei Weng et al., "Smart Polymeric Cathode Material with Intrinsic Overcharge Protection Based on a 2,5-Di-tert-butyl-1,4-

(56) References Cited

OTHER PUBLICATIONS dimethoxybenzene Core Structure", Advanced Functional Materials, Nov. 7, 2012, vol. 22, No. 21, pp. 4485-4492, XP001581908.
Patricia S. Bey et al., "Effect of a Novel Catechol Copolymer on Cuticle Sclerotization by the American Cockroach", Journal of Bioactive and Compatible Polymers, Oct. 1987, vol. 2, pp. 312-324, XP008178878.
Yuta Saito et al., "Synthesis of poly(dihydroxystyrene-block-styrene)(PDHSt-b-PSt) by the RAFT process and preparation of organic-solvent-dispersive Ag NPs by automatic reduction of metal ions in the presence of PDHSt-b-PSt", Chemical Communications, 2015, vol. 51, 5 total pages, XP002753885.
J. V. Crivello, et al., "Synthesis and Photopolymerization of Monomers Bearing Isopropenylphenoxy Groups", Journal of Polymer Science: Part A: Polymer Chemistry, vol. 33, 1995, pp. 653-663.
Hiroyoshi Kamogawa, et al., "Syntheses of Polymerizable Hydroquinone Derivatives", Journal of Polymer Science: Polymer Chemistry Edition, vol. 14, 1976, pp. 1235-1240.
U.S. Appl. No. 14/903,864, filed Jan. 8, 2016, US-2016-0233509 A1, B. Häupler, et al.
U.S. Appl. No. 15/123,071, filed Sep. 1, 2016, US-2017-0114162 A1, B. Häupler, et al.
U.S. Appl. No. 15/129,910, filed Sep. 28, 2016, US-2017-0179525 A1, B. Häupler, et al.
U.S. Appl. No. 15/247,434, filed Aug. 25, 2016, US-2017-0058062 A1, U. Schubert, et al.
U.S. Appl. No. 15/247,346, filed Aug. 25, 2016, US-2017-0062825 A1, U. Schubert, et al.
U.S. Appl. No. 15/568,871, filed Oct. 24, 2017, U. Schubert, et al.
Alexandru Vlad, et al., "Melt-Polymerization of TEMPO Methacrylates with Nano Carbons Enables Superior Battery Materials" ChemSusChem, vol. 8, 2015, pp. 1692-1696.
H. Hopff, et al., "On 2-vinylthianthrene and its polymerization products" Makromolekul. Chem. 1963, 60, 129 (with English language translation).
Harry R. Allcock, et al., "The synthesis and applications of novel aryloxy/oligoethyleneoxy substituted polyphosphazenes as solid polymer electrolytes", Solid State Ionics, vol. 156, 2003, pp. 401-414.
P. Baum, et al., Novel cation conductors based on rigid-rod poly (p-phenylene)s, Polymer, vol. 41, 2000, pp. 965-973.
Craig J. Hawker et al., "Hyperbranched Poly(ethylene glycol)s: A New Class of Ion-Conducting Materials", Macromolecules, vol. 29, 1996, pp. 3831-3838.
Ying-Pin Huang, et al., "Polymer Electrolyte Containing Dialkoxyacenes with Oligo(ethylene oxide) Side Chains", Journal of the Chinese Chemical Society, vol. 53, 2006, pp. 1335-1342.
Takahito Itoh, et al., "Polymer Electrolytes Plasticized With Hyperbranched Polymer for Lithium Polymer Batteries" Ionics, vol. 10, 2004, pp. 450-457.
Takahito Itoh, et al., "Polymer electrolytes based on hyperbranched polymers", Journal of Power Sources, vol. 97-98, 2001, pp. 637-640.
Takahito Itoh, et al., "Composite polymer electrolytes of poly(ethylene oxide)/BaTiO$_3$/Li salt with hyperbranched polymer" Journal of Power Sources, vol. 119-121, 2003, pp. 403-408.
Takahito Itoh, et al., "Polymer electrolytes based on hyperbranched polymer with cross-linkable groups at the terminals", Journal of Power Sources, vol. 146, 2005, pp. 371-375.
Takahito Itoh, et al., "Solid polymer electrolytes based on comblike polymers", Journal of Power Sources, vol. 163, 2006, pp. 252-257.
Takahito Itoh, et al., "Properties of the cross-linked composite polymer electrolytes using hyperbranched polymer with terminal acryloyl groups", Journal of Power Sources, vol. 174, 2007, pp. 1167-1171.
Takahito Itoh, et al., "Anhydrous proton-conducting electrolyte membranes based on hyperbranched polymer with phosphonic acid groups for high-temperature fuel cells", Journal of Power Sources, vol. 178, 2008, pp. 627-633.
Takahito Itoh, et al., "Composite Polymer Electrolytes Based on Hyperbranched Polymer and Application to Lithium Polymer Batteries", Solid State Ionics, 2002, pp. 215-236.
Takahito Itoh, et al., "Composite polymer electrolytes based on poly(ethylene oxide), hyperbranched polymer, BaTiO$_3$ and LiN(CF$_3$SO$_2$)$_2$," Solid State Ionics, vol. 156, 2003, pp. 393-399.
Takahito Itoh, et al., "Ionic Conductivity and Mechanical Property of Cross-linked Hyperbranched Polymer Electrolytes for Lithium Secondary Batteries", Transactions of the Material Research Society of Japan, vol. 29, No. 3, May 2004, pp. 1025-1030 and cover sheet.
Takahito Itoh, et al., "Proton-conducting electrolyte membranes based on hyperbranched polymer with a sulfonic acid group for high-temperature fuel cells", Electrochimica Acta, vol. 55, 2010, pp. 1419-1424.
Takahito Itoh, "Hyperbranched Polymer-Based Electrolyte for Lithium Polymer Batteries" Journal of Fudan University (Natural Science), vol. 44, No. 5, 2005, pp. 664-665.
Thomas Jähnert, et al., "Polymers Based on Stable Phenoxyl Radicals for the Use in Organic Radical Batteries", Macromolecular Rapid Communications, vol. 35, 2014, pp. 882-887.
Lu Zhang, et al., "Molecular engineering towards safer lithium-ion batteries: a highly stable and compatible redox shuttle for overcharge protection", Energy & Environmental Science, vol. 5, 2012, pp. 8204-8207.
Houshang Karimi, et al., "Electrochemistry of Tetracyanoquinodimethane Polymer-Modified Electrodes", Journal of Electroanalytical Chemistry, vol. 217, 1987, pp. 313-329.
Kunsoo Kim, et al., "Synthesis and Optical Properties of Poly(p-phenylene) Electrolyte Attached with Oligo(ethylene oxide) Side Chains" Polymer (Korea), vol. 23, No. 5, 1999, pp. 1-11 (with English Abstract and English language translation).
U. Lauter, et al., "Molecular Composites from Rigid-Rod Poly(p-phenylene)s with Oligo(oxyethylene) Side Chains as Novel Polymer Electrolytes" Macromolecules, vol. 30, No. 7, 1997, pp. 2092-2101.
Masashi Matsumoto, et al., "Polymer electrolytes based on polycarbonates and their electrochemical and thermal properties" Ionics, vol. 19, 2013, pp. 615-622.
L.M. Moshurchak, et al., "High-Potential Redox Shuttle for Use in Lithium-Ion Batteries", Journal of The Electrochemical Society, vol. 156, No. 4, 2009, pp. A309-A312.
Q. Li et al., "Composite Cathode for Low-Temperature All-Solid Polymer Lithium Cells" Electrochemical and Solid-State Letters, vol. 7, No. 12, 2004, pp. A470-A473.
B. Proksa, "Capillary zone electrophoretic separation of (R,S)-metipranolol and related substances" Pharmazie, vol. 54, 1999, pp. 431-434.
J. Morgado, et al., "Light-emitting devices based on a poly(p-phenylene vinylene) derivative with ion-coordinating side groups" Journal of Applied Physics, vol. 86, No. 11, 1999, pp. 6392-6395.
Zhaoyin Wen, et al., "Characterization of composite electrolytes based on a hyperbranched polymer" Journal of Power Sources, vol. 90, 2000, pp. 20-26.
Tobias Janoschka, et al., "Storage devices—radically organic", Polymere, Nachrichten aus der Chemie, vol. 60, 2012, pp. 728-731 (with English language translation).
U.S. Appl. No. 16/301,810, filed Nov. 15, 2018, Dr. Christian Meier, et al.

\* cited by examiner

USE OF CERTAIN POLYMERS AS A CHARGE STORE

The present invention relates to polymers and to the use thereof in the form of active electrode material or in an electrode slurry as electrical charge storage means, the electrical charge storage means especially being secondary batteries. These secondary batteries are especially notable for high cell voltages, high power densities and simple and scalable processing and production methods (for example by means of screen printing).

BACKGROUND OF THE INVENTION

Organic batteries are electrochemical cells which use an organic charge storage material as active electrode material for storing electrical charge. These secondary batteries are notable for their exceptional properties, such as fast chargeability, long lifetime, low weight, high flexibility and ease of processibility. Active electrode materials which have been described for charge storage in the prior art are various polymeric structures, for example polymeric compounds having organic nitroxide radicals as active units (for example in WO 2012133202 A1, WO 2012133204 A1, WO 2012120929 A1, WO 2012153866 A1, WO 2012153865 A1, JP 2012-221574 A, JP 2012-221575 A, JP 2012-219109 A, JP 2012-079639 A, WO 2012029556 A1, WO 2012153865 A1, JP 2011-252106 A, JP 2011-074317 A, JP 2011-165433 A, WO 2011034117 A1, WO 2010140512 A1, WO 2010104002 A1, JP 2010-238403 A, JP 2010-163551 A, JP 2010-114042 A, WO 2010002002 A1, WO 2009038125 A1, JP 2009-298873 A, WO 2004077593 A1, WO 2009145225 A1, JP 2009-238612 A, JP 2009-230951 A, JP 2009-205918 A, JP 2008-234909 A, JP 2008-218326 A, WO 2008099557 A1, WO 2007141913 A1, US 20020041995 A1, EP 1128453 A21 A. Vlad, J. Rolland, G. Hauffman, B. Ernould, J.-F. Gohy, ChemSusChem 2015, 8, 1692-1696) or polymeric compounds having organic phenoxyl radicals or galvinoxyl radicals as active units (for example US 2002/0041995 A1, JP 2002-117852 A).

Other known active units for charge storage are polymeric compounds having quinones (for example JP 2009-217992 A, WO 2013/099567 A1, WO 2011/068217 A1), having diones (for example JP 2010-212152 A), and having dicyanodiimines (for example JP 2012-190545 A, JP 2010-55923 A).

Polymers including dialkoxybenzene have also been described in the prior art for a multitude of different applications. These include the use thereof as epoxy resins for sealing of semiconductor modules (for example described in JP 2013098217 A, JP 2012224758 A, JP 2011231153 A, JP 2011138037 A, JP 2010282154 A, JP 2010266556 A, JP 2010077303 A, JP 2008296436 A or WO 2004098745 A1). In addition, dialkoxybenzene-containing non-polymeric compounds have been used as "redox shuttle" additives for Li ion batteries, in order to prevent overcharging of the Li battery (WO 2011/149970 A2). In addition, the use of particular polymers based on dialkoxybenzenes as charge storage means has also been described (P. Nesvadba, L. B. Folger, P. Maire, P. Novak, *Synth. Met.* 2011, 161, 259-262, abbreviated hereinafter to "Nesvadba et al."; W. Weng, Z. C. Zhang, A. Abouimrane, P. C. Redfern, L. A. Curtiss, K. Amine, *Adv. Funct. Mater.* 2012, 22, 4485-4492, abbreviated hereinafter to "Weng et al."). However, these polymers described by Nesvadba et al. and Weng et al. have several disadvantages. Although these have a redox potential above that of the frequently used nitroxide radicals and hence enable higher cell voltages when the dialkoxybenzene-containing polymers are used as cathode material, batteries which have been produced with these polymers described in the literature exhibit only low discharge capacities. It is thus desirable, and therefore is a problem addressed by the invention, to provide polymers with which an even higher cell voltage, higher capacity and hence higher specific energy can be achieved. In addition, synthesis complexity is a further criterion for the usability of organic materials as active electrode materials. A further problem addressed by the present invention was therefore that of providing polymers that can be synthesized in a very simple manner.

DETAILED DESCRIPTION OF THE INVENTION

Surprisingly, polymers which solve the problems mentioned in the present document have been found. The present invention accordingly relates to 1. a polymer comprising $n^1$ mutually linked repeat units of the chemical structure (I) or $n^2$ mutually linked repeat units of the chemical structure (II) with

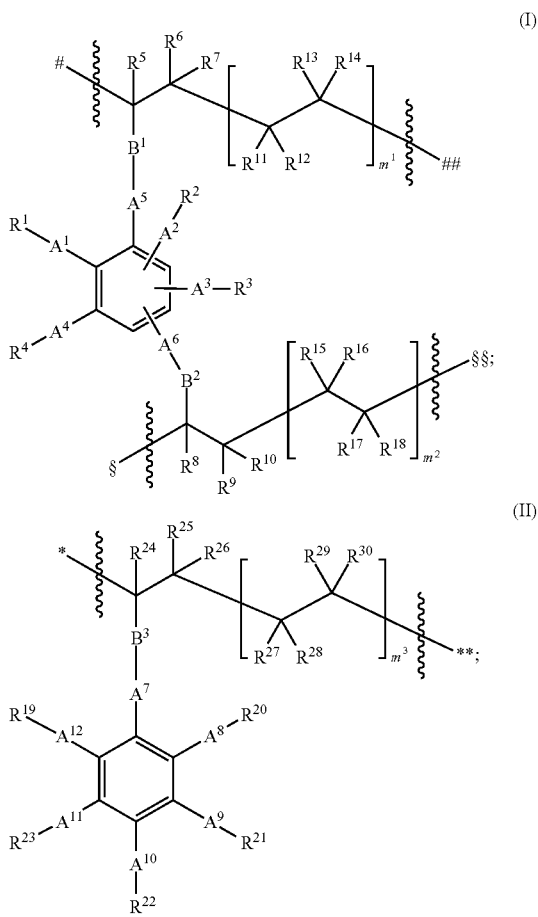

where $n^1$ and $n^2$ are each independently an integer≥4, where $m^1$, $m^2$, $m^3$ are each independently an integer≥0, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "##" in a particular repeat unit is joined by the bond identified by "#" in the adjacent repeat unit and the bond identified by "§ §" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ radicals are each independently selected from the group consisting of hydrogen, (hetero)aromatic radical, aliphatic radical optionally substituted by at least one group selected from nitro group, $-NH_2$, $-CN$, $-SH$, $-OH$, halogen and optionally having at least one group selected from ether, thioether, amino ether, carbonyl group, carboxylic ester group, carboxamide group, sulphonic ester group, phosphoric ester, where at least two of $A^1$, $A^2$, $A^3$, $A^4$, $A^5$, $A^6$ are each an oxygen or sulphur atom and the others of $A^1$, $A^2$, $A^3$, $A^4$, $A^5$, $A^6$ are each a direct bond, where at least two of $A^7$, $A^8$, $A^9$, $A^{10}$, $A^{11}$, $A^{12}$ are each an oxygen or sulphur atom and the others of $A^7$, $A^8$, $A^9$, $A^{10}$, $A^{11}$, $A^{12}$ are each a direct bond, and where at least two radicals in ortho positions to one another among the $R^1$, $R^2$, $R^3$, $R^4$ radicals and/or at least two radicals in ortho positions to one another among the $R^{19}$, $R^{20}$, $R^{21}$, $R^{22}$, $R^{23}$ radicals may each also be bridged by at least one (hetero)aromatic ring or aliphatic ring optionally substituted by at least one group selected from nitro group, $-NH_2$, $-CN$, $-SH$, $-OH$, halogen, alkyl group and optionally having at least one group selected from ether, thioether, amino ether, carbonyl group, carboxylic ester group, carboxamide group, sulphonic ester group, phosphoric ester, and where the $R^1$ radical in the case that $A^1$=direct bond, the $R^2$ radical in the case that $A^2$=direct bond, the $R^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may each also be selected from the group consisting of nitro group, $-CN$, $-F$, $-Cl$, $-Br$, $-I$, $-COOR^{36}$, $-C(=O)NHR^{37}$, $-NR^{38}R^{39}$, where $R^{36}$, $R^{37}$, $R^{38}$, $R^{39}$ are each independently selected from the group consisting of hydrogen, (hetero)aromatic radical, aliphatic radical optionally substituted by at least one group selected from nitro group, $-NH_2$, $-CN$, $-SH$, $-OH$, halogen and optionally having at least one group selected from ether, thioether, amino ether, carbonyl group, carboxylic ester group, carboxamide group, sulphonic ester group, phosphoric ester, and where the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may independently also be a radical of the formula $-O-R^{40}$ where $R^{40}$ is an aliphatic radical optionally substituted by at least one group selected from nitro group, $-NH_2$, $-CN$, $-SH$, $-OH$, halogen and optionally having at least one group selected from ether, thioether, amino ether, carbonyl group, carboxylic ester group, carboxamide group, sulphonic ester group, phosphoric ester, and where $B^1$, $B^2$, $B^3$ are each independently selected from the group consisting of &—$(CH_2)_{p1}$—&& where p1 is an integer from 1 to 4, and where at least one —$CH_2$— group may also be replaced by —$C(=O)$—, &—$(CH_2)_{r1}$—$B^5$—$(CH_2)_{r2}$—&& where $B^5$ is a (hetero) aromatic divalent 6-membered ring, 3-membered ring or 5-membered ring and r1, r2 are each 0 or 1, where r1+r2≤1, &—$(CH_2)_{q1}$—$B^6$—$(CH_2)_{q2}$—&& with $B^6$=O, S, NH; q1=0, 1, 2 and q2=1, 2, 3 where q1+q2≤3 and where one —$CH_2$— group may also be replaced by —$C(=O)$—,

&—O—C(=O)—NH—$CH_2$—&&, and where $B^1$, in the case that $A^5$=direct bond, $B^2$ in the case that $A^6$=direct bond, $B^3$ in the case that $A^7$=direct bond, may each independently also selected from the group consisting of &—$(CH_2)_5$—&& where at least one —$CH_2$— group may also be replaced by —$C(=O)$—, &—$(CH_2)_{v1}$—$B^7$—$(CH_2)_{v2}$—&& with $B^7$=O, S, NH; v1=0, 1, 2, 3 and v2=1, 2, 3, 4, where v1+v2=4 and where one —$CH_2$— group may also be replaced by —$C(=O)$—, &—$(CH_2)_{t1}$—$B^8$—$(CH_2)_{t2}$—&& where $B^8$ is a (hetero) aromatic divalent 3-membered ring, 5-membered ring or 6-membered ring and t1, t2 are each 0 or 2, where t1+t2≤2,

&—$CH_2$—O—C(=O)—NH—$CH_2$—&&, &—O—C(=O)—NH—&&, &—$CH_2$—O—C(=O)—NH—&&,

&—$CH_2$—$CH_2$—O—C(=O)—NH—&&, &—O—C(=O)—NH—$CH_2$—$CH_2$—&&, and where $B^1$, in the case that $A^5$=O or S, $B^2$ in the case that $A^6$=O or S, $B^3$ in the case that $A^7$=O or S, may in each case also be a direct bond, and where, in the $B^1$, $B^2$, $B^3$ radicals, at least one hydrogen atom bonded to a carbon atom or nitrogen atom may be replaced by a halogen atom or an alkyl group, and where "&&" for $B^1$ denotes the bond pointing toward $A^5$, for $B^2$ the bond pointing toward $A^6$, and for $B^3$ the bond pointing toward $A^7$, and where "&" for $B^1$ denotes the bond pointing toward $R^5$, for $B^2$ the bond pointing toward $R^8$, and for $B^3$ the bond pointing toward $R^{24}$.

The polymer according to the invention may especially comprise $n^1$ mutually linked repeat units of the chemical structure (I) with the above-specified definitions of $R^1$ to $R^{18}$, $A^1$ to $A^6$, $B^1$, $B^2$, $m^1$, $m^2$. The polymer according to the invention may alternatively especially comprise $n^2$ mutually linked repeat units of the chemical structure (II) with the above-specified definitions of $R^{19}$ to $R^{30}$, $A^7$ to $A^{12}$, $B^3$, $m^3$.

2. The present invention especially relates to a polymer comprising $n^1$ mutually linked repeat units of the chemical structure (I) or $n^2$ mutually linked repeat units of the chemical structure (II) with

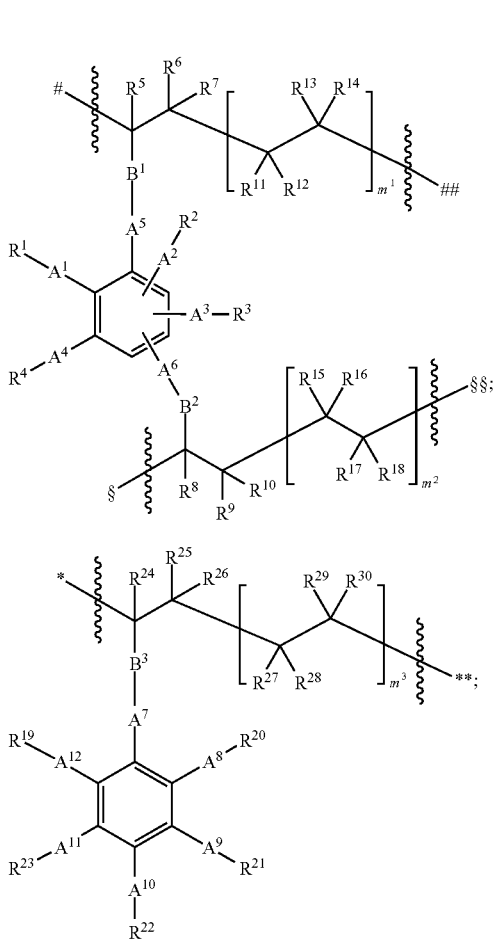

(I)

(II)

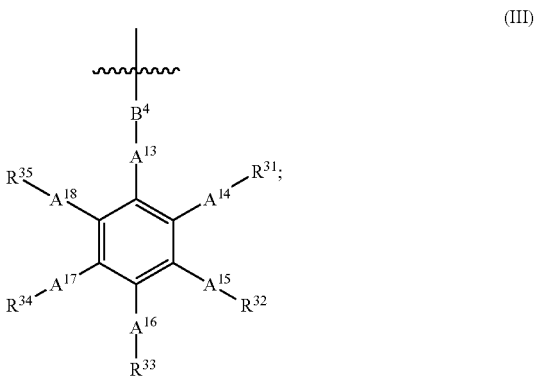

(III)

where $n^1$ and $n^2$ are each independently an integer≤4, especially ≤4 and ≤5000, where $m^1$, $m^2$, $m^3$ are each independently an integer≤0, especially ≥0 and ≤5000, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "##" in a particular repeat unit is joined by the bond identified by "#" in the adjacent repeat unit and the bond identified by "§ §" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ radicals are each independently selected from the group consisting of hydrogen, phenyl, benzyl, aliphatic radical optionally substituted by at least one group selected from nitro group, $-NH_2$, $-CN$, $-SH$, $-OH$, halogen and optionally having at least one group selected from ether, thioether, amino ether, carbonyl group, carboxylic ester group, carboxamide group, sulphonic ester group, phosphoric ester, especially from the group consisting of hydrogen, alkyl group optionally substituted by at least one group selected from nitro group, $-CN$, -halogen and optionally having at least one group selected from ether, thioether, and preferably an alkyl group having 1 to 30 carbon atoms, and where the $R^{11}$, $R^{13}$, $R^{15}$, $R^{17}$ radicals may each independently also be a group of the general structure (III) with in which the $R^{31}$, $R^{32}$, $R^{33}$, $R^{34}$, $R^{35}$ radicals may independently be as defined for $R^1$, where at least two, especially exactly two, of $A^1$, $A^2$, $A^3$, $A^4$, $A^5$, $A^6$ are each an oxygen or sulphur atom and the others of $A^1$, $A^2$, $A^3$, $A^4$, $A^5$, $A^6$ are each a direct bond, where at least two, especially exactly two, of $A^7$, $A^8$, $A^9$, $A^{10}$, $A^{11}$, $A^{12}$ are each an oxygen or sulphur atom and the others of $A^7$, $A^8$, $A^9$, $A^{10}$, $A^{11}$, $A^{12}$ are each a direct bond, where at least two, especially exactly two, of $A^{13}$, $A^{14}$, $A^{15}$, $A^{16}$, $A^{17}$, $A^{18}$ are each an oxygen or sulphur atom and the others of $A^{13}$, $A^{14}$, $A^{15}$, $A^{16}$, $A^{17}$, $A^{18}$ are each a direct bond, and where at least two radicals in ortho positions to one another among the $R^1$, $R^2$, $R^3$, $R^4$ radicals and/or at least two radicals in ortho positions to one another among the $R^{19}$, $R^{20}$, $R^{21}$, $R^{22}$, $R^{23}$ radicals and/or at least two radicals in ortho positions to one another among the $R^{31}$, $R^{32}$, $R^{33}$, $R^{34}$, $R^{35}$ radicals may each also be bridged by at least one (hetero)aromatic ring or by at least one aliphatic ring optionally substituted by at least one group selected from nitro group, $-NH_2$, $-CN$, $-SH$, $-OH$, halogen, alkyl group and optionally having at least one group selected from ether, thioether, amino ether, carbonyl group, carboxylic ester group, carboxamide group, sulphonic ester group, phosphoric ester, and where the $R^1$ radical in the case that $A^1$=direct bond, the $R^2$ radical in the case that $A^2$=direct bond, the $R^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond, the $R^{31}$ radical in the case that $A^{14}$=direct bond, the $R^{32}$ radical in the case that $A^{15}$=direct bond, the $R^{33}$ radical in the case that $A^{16}$=direct bond, the $R^{34}$ radical in the case that $A^{17}$=direct bond, the $R^{35}$ radical in the case that $A^{18}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may each also be selected from the group consisting of nitro group, —CN, —F, —C, —Br, —I, —COOR$^{36}$, —C(═O)NHR$^{37}$, —NR$^{38}$R$^{39}$, where R$^{36}$, R$^{37}$, R$^{38}$, R$^{39}$ are each independently selected from the group consisting of hydrogen, (hetero)aromatic radical, aliphatic radical optionally substituted by at least one group selected from nitro group, —NH$_2$, —CN, —SH, —OH, halogen and optionally having at least one group selected from ether, thioether, amino ether, carbonyl group, carboxylic ester group, carboxamide group, sulphonic ester group, phosphoric ester, especially from the group consisting of nitro group, —CN, —F, —Cl, —Br, —I, and where the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ radicals may independently also be a radical of the formula —O—R$^{40}$ where R$^{40}$ is an aliphatic radical optionally substituted by at least one group selected from nitro group, —NH$_2$, —CN, —SH, —OH, halogen and optionally having at least one group selected from ether, thioether, amino ether, carbonyl group, carboxylic ester group, carboxamide group, sulphonic ester group, phosphoric ester, and where R$^{40}$ may especially be an alkyl group having 1 to 30 carbon atoms, and where $B^1$, $B^2$, $B^3$, $B^4$ are each independently selected from the group consisting of &—(CH$_2$)$_{p1}$—&& where p1 is an integer from 1 to 4, and where at least one —CH$_2$— group may also be replaced by —C(═O)—, &—(CH$_2$)$_{r1}$—B$^5$—(CH$_2$)$_{r2}$—&& where B$^5$ is a (hetero) aromatic divalent 6-membered ring, 3-membered ring or 5-membered ring and r1, r2 are each 0 or 1, where r1+r2≤1, &—(CH$_2$)$_{q1}$—B—(CH$_2$)$_{q2}$—&& with B$^6$═O, S, NH; q1=0, 1, 2 and q2=1, 2, 3 where q1+q2≤3 and where one —CH$_2$— group may also be replaced by —C(═O)—,

&—O—C(═O)—NH—CH$_2$—&&, and where $B^1$, in the case that $A^5$=direct bond, $B^2$ in the case that $A^8$=direct bond, $B^3$ in the case that $A^7$=direct bond, $B^4$ in the case that $A^{13}$=direct bond, may each independently also be selected from the group consisting of &—(CH$_2$)$_5$—&& where at least one —CH$_2$— group may also be replaced by —C(═O)—, &—(CH$_2$)$_{v1}$—B$^7$—(CH$_2$)$_{v2}$—&& with B$^7$═O, S, NH; v1=0, 1, 2, 3 and v2=1, 2, 3, 4, where v1+v2=4 and where one —CH$_2$— group may also be replaced by —C(═O)—, &—(CH$_2$)$_{t1}$—B$^8$—(CH$_2$)$_{t2}$—&& where B$^8$ is a (hetero) aromatic divalent 3-membered ring, 5-membered ring or 6-membered ring and t1, t2 are each 0 or 2, where t1+t2≤2,

&—CH$_2$—O—C(═O)—NH—CH$_2$—&&, &—O—C(═O)—NH—&&, &—CH$_2$—O—C(═O)—NH—&&,

&—CH$_2$—CH$_2$—O—C(═O)—NH—&&, &—O—C(═O)—NH—CH$_2$—CH$_2$—&&, and where $B^1$, in the case that $A^5$=O or S, $B^2$ in the case that $A^6$=O or S, $B^3$ in the case that $A^7$=O or S, $B^4$ in the case that $A^{13}$=O or S, may in each case also be a direct bond, and where, in the $B^1$, $B^2$, $B^3$, $B^4$ radicals, at least one hydrogen atom bonded to a carbon atom or nitrogen atom may be replaced by a halogen atom or an alkyl group, and where "&&" for $B^1$ denotes the bond pointing toward $A^5$, for $B^2$ the bond pointing toward $A^6$, for $B^3$ the bond pointing toward $A^7$, and for $B^4$ the bond pointing toward $A^{13}$, and where "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

The polymer according to the invention as per point 2 may especially comprise n$^1$ mutually linked repeat units of the chemical structure (1) with the above-specified definitions of $R^1$ to $R^{18}$, $A^1$ to $A^6$, $B^1$, $B^2$, m$^1$, m$^2$.

The polymer according to the invention may alternatively especially comprise n$^2$ mutually linked repeat units of the chemical structure (II) with the above-specified definitions of $R^{19}$ to $R^{30}$, $A^7$ to $A^{12}$, $B^3$, m$^3$.

3. In a preferred embodiment, the present invention relates to a polymer comprising n$^1$ mutually linked repeat units of the chemical structure (I) or n$^2$ mutually linked repeat units of the chemical structure (II) with

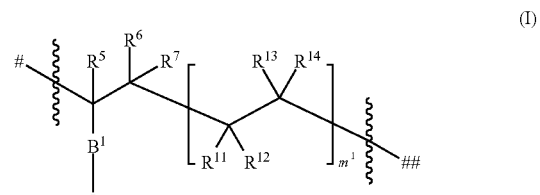

(I)

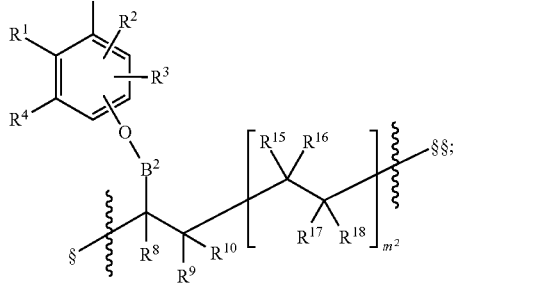

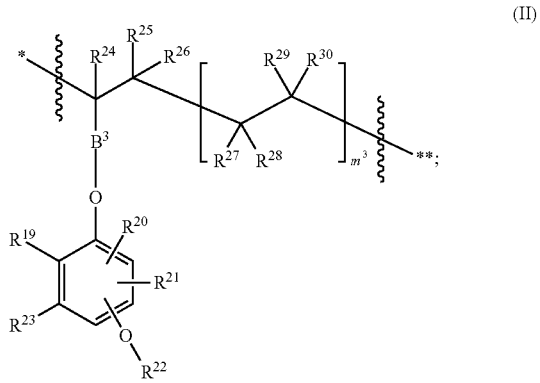

(II)

where n$^1$ and n$^2$ are each independently an integer≥4 and ≤5000, especially ≥10 and ≤1000, where m$^1$, m$^2$, m$^3$ are each independently an integer≥0 and ≤5000, especially ≥0 and ≤1000, where the repeat units of the chemical structure (I) within the polymer are the same or at least partly different from one another, where the repeat units of the chemical structure (II) within the polymer are the same or at least partly different from one another, where the repeat units of the chemical structure (I) within the polymer are joined to one another in such a way that the bond identified by "##" in a particular repeat unit is joined by the bond identified by "#" in the adjacent repeat unit and the bond identified by "§§" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, $R^{30}$ radicals are each independently selected from the group consisting of hydrogen, alkyl group having 1 to 30 carbon atoms,
especially from the group consisting of hydrogen, alkyl group having 1 to 8 carbon atoms,
and where $R^{22}$ is an alkyl group having 1 to 30 and especially having 1 to 8 carbon atoms, and where the $R^{11}$, $R^{13}$, $R^{15}$, $R^{17}$ radicals may each independently also be a group of the general structure (III) with

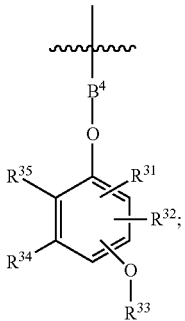

(III)

where the $R^{31}$, $R^{32}$, $R^{34}$, $R^{35}$ radicals are each independently selected from the group consisting of
hydrogen, alkyl group having 1 to 30 carbon atoms,
especially from the group consisting of hydrogen, alkyl group having 1 to 8 carbon atoms,
and where $R^{33}$ is an alkyl group having 1 to 30 and especially having 1 to 8 carbon atoms,
and where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ may each also be selected from the group consisting of
nitro group, —CN, —F, —Cl, —Br, —I, —O—$R^{40}$ where $R^{40}$ is an alkyl group having 1 to 30 and preferably 1 to 8 carbon atoms,
and where $B^1$, $B^2$, $B^3$, $B^4$ are each independently selected from the group consisting of direct bond,
&—$(CH_2)_{p1}$—&& where p1 is an integer from 1 to 4, and where at least one —$CH_2$— group may also be replaced by —C(=O)—,
&—$(CH_2)_{r1}$—$B^5$—$(CH_2)_{r2}$—&& where $B^5$ is a (hetero) aromatic divalent 6-membered ring, 3-membered ring or 5-membered ring and r1, r2 are each 0 or 1, where r1+r2≤1 (where, preferably, r1=0 and r2=1 and $B^5$=phenylene, more preferably 1,4-phenylene),
&—$(CH_2)_{q1}$—$B^6$—$(CH_2)_{q2}$—&& with $B^6$=O, S, NH; q1=0, 1, 2 and q2=1, 2, 3 where q1+q2≤3 and where one —$CH_2$— group may also be replaced by —C(=O)—,
&—O—C(=O)—NH—$CH_2$—&&,
and where "&&" for $B^1$ denotes the bond pointing toward $A^5$=oxygen, for $B^2$ the bond pointing toward $A^6$=oxygen, for $B^3$ the bond pointing toward $A^7$=oxygen, and for $B^4$ the bond pointing toward $A^{13}$=oxygen,
and where "&" for $B^1$ denotes the bond pointing toward $R^5$, for $B^2$ the bond pointing toward $R^6$, for $B^3$ the bond pointing toward $R^{24}$, and for $B^4$ the bond pointing toward $R^{12}$ or $R^{14}$ or $R^{16}$ or $R^{18}$.

The polymer according to the invention in the preferred embodiment as per point 3 may especially comprise $n^1$ mutually linked repeat units of the chemical structure (I) with the definitions of $R^1$ to $R^{18}$, $B^1$, $B^2$, $m^1$, $m^2$ that are specified for the preferred embodiment.

The polymer according to the invention in the preferred embodiment as per point 3 may alternatively especially comprise $n^2$ mutually linked repeat units of the chemical structure (II) with the definitions of $R^{19}$ to $R^{30}$, $B^3$, $m^3$ that are specified for the preferred embodiment.

4. In a more preferred embodiment, the present invention relates to a polymer comprising $n^1$ mutually linked repeat units of the chemical structure (I) or $n^2$ mutually linked repeat units of the chemical structure (II) with

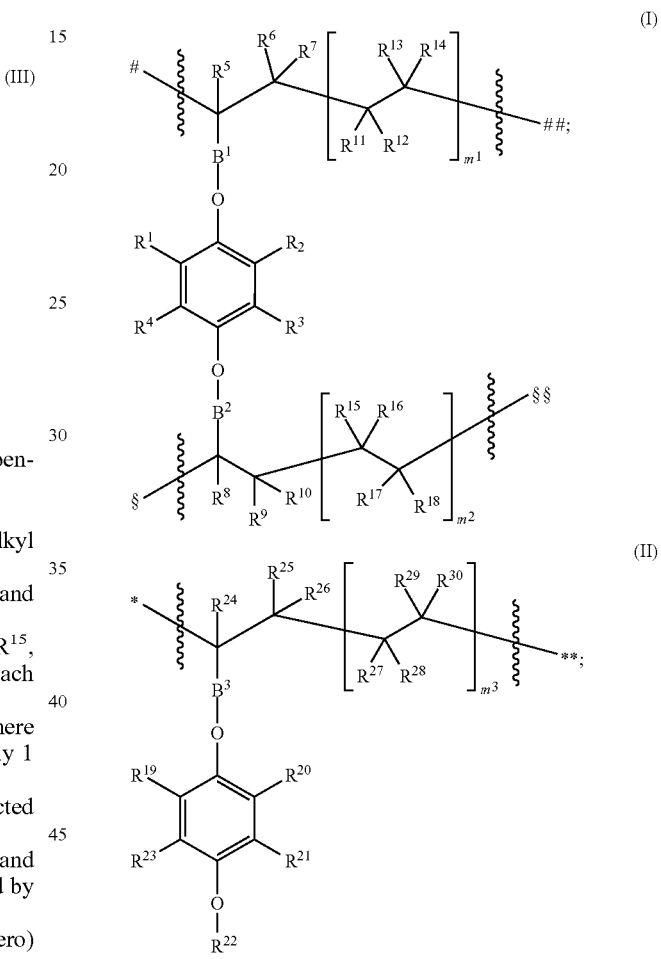

where $n^1$ and $n^2$ are each independently an integer≥10 and ≤1000,
where $m^1$, $m^2$, $m^3$ are each independently an integer≥0 and ≤1000,
where the repeat units of the chemical structure (I) within the polymer are the same or at least partly different from one another,
where the repeat units of the chemical structure (II) within the polymer are the same or at least partly different from one another,
where the repeat units of the chemical structure (I) within the polymer are joined to one another in such a way that the bond identified by "##" in a particular repeat unit is joined by the bond identified by "#" in the adjacent repeat unit and the bond identified by "§§" in a particular repeat unit is joined by the bond identified by "§" in the adjacent repeat unit, where the repeat units of the chemical structure (II) within the polymer are joined to one another in such a way that the bond identified by "*" in a particular repeat unit is joined by the bond identified by "**" in the adjacent repeat unit, where the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, $R^{30}$ radicals are each independently selected from the group consisting of hydrogen, alkyl group having 1 to 8 carbon atoms, and where $R^{22}$ is an alkyl group having 1 to 8 carbon atoms, and where the $R^{11}$, $R^{13}$, $R^{15}$, $R^{17}$ radicals may each independently also be a group of the general structure (III) with

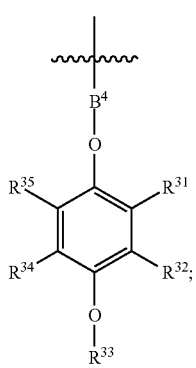

(III)

where the $R^{31}$, $R^{32}$, $R^{34}$, $R^{35}$ radicals are each independently selected from the group consisting of hydrogen, alkyl group having 1 to 8 carbon atoms, and where $R^{33}$ is an alkyl group having 1 to 8 carbon atoms, and where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, $R^{30}$ may each also be selected from the group consisting of nitro group, —CN, —F, —Cl, —Br, —I, —O—$R^{40}$ where $R^{40}$ is an alkyl group having 1 to 8 carbon atoms, and where $B^1$, $B^2$, $B^3$, $B^4$ are each independently selected from the group consisting of direct bond, &—$(CH_2)_{p1}$—&& where p1 is an integer from 1 to 3, &—$B^5$—$CH_2$—&& where $B^5$=phenylene, more preferably 1,4-phenylene, &—$(CH_2)_{q1}$—$B^6$—$(CH_2)_{q2}$—&& with $B^6$=O, S; q1=0, 1, 2 and q2=1, 2, 3 where q1+q2≤3, preferably q1+q2≤2,

&—O—C(=O)—NH—$CH_2$—&&, and where "&&" for $B^1$ denotes the bond pointing toward $A^5$=oxygen, for $B^2$ the bond pointing toward $A^6$=oxygen, for $B^3$ the bond pointing toward $A^7$=oxygen, and for $B^4$ the bond pointing toward $A^{13}$=oxygen, and where "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

The polymer according to the invention in the more preferred embodiment as per point 4 may especially comprise $n^1$ mutually linked repeat units of the chemical structure (I) with the definitions of $R^1$ to $R^{18}$, $B^1$, $B^2$, $m^1$, $m^2$ that are specified for the more preferred embodiment.

The polymer according to the invention in the more preferred embodiment as per point 4 may alternatively especially comprise $n^2$ mutually linked repeat units of the chemical structure (II) with the definitions of $R^{19}$ to $R^{30}$, $B^3$, $m^3$ that are specified for the more preferred embodiment.

Even more preferably, in the polymer according to the invention, $R^1$=$R^3$, $R^2$=$R^4$, $R^{19}$=$R^{21}$, $R^{20}$=$R^{23}$, $R^{31}$=$R^{34}$, $R^{32}$=$R^{35}$, where, in particular, $R^5$ to $R^{18}$ and $R^{24}$ to $R^{30}$ are each hydrogen.

Even more preferably, $R^1$=$R^3$=H, $R^2$=$R^4$=alkyl group having 1 to 8 and especially 1 to 6 carbon atoms, $R^{19}$=$R^{21}$=H, $R^{20}$=$R^{23}$=alkyl group having 1 to 8 and especially 1 to 6 carbon atoms, $R^{31}$=$R^{34}$=H, $R^{32}$=$R^{35}$=alkyl group having 1 to 8 and especially 1 to 6 carbon atoms and $B^1$, $B^2$, $B^3$, $B^4$ are each independently selected from the group consisting of direct bond, methylene, ethylene, n-propylene, &—$B^5$—$CH_2$—&& where $B^5$=1,4-phenylene, even more preferably from the group consisting of direct bond, methylene, ethylene, n-propylene, preferably with $B^1$, $B^2$, $B^3$, $B^4$ each a direct bond or methylene, more preferably with $B^1$, $B^2$, $B^3$, $B^4$ each methylene, and where, in particular, $R^5$ to $R^{18}$ and $R^{24}$ to $R^{30}$ are each hydrogen, where "&&" and "&" are each as defined above.

The polymers according to the invention are easily preparable and are notable in that they can be used in secondary batteries with higher cell voltage and higher capacity of the corresponding battery, even after undergoing several charge/discharge cycles. These polymers described have a more compact structure than those described by Nesvadba et al. and Weng et al., since the "spacer" which is formed by $B^1$ and $A^5$ or $B^2$ and $A^6$ or $B^3$ and $A^7$ or $B^4$ and $A^{13}$ is shorter than that in the polymers described by Nesvadba et al. and Weng et al.

The polymer according to the invention comprises $n^1$ mutually linked repeat units of the chemical structure (I) or $n^2$ mutually linked repeat units of the chemical structure (II).

In this polymer, $n^1$ and $n^2$ are each independently an integer≥4, especially an integer≥4 and ≤5000, preferably an integer≥10 and ≤1000.

$m^1$, $m^2$, $m^3$ are independently an integer≥0, especially ≥0 and ≤5000, preferably ≥0 and ≤1000.

In this polymer, the average molar mass (determined by means of size exclusion chromatography with polystyrene standard; DIN 55672-2:2015-02) is especially 700 to 2 000 000 g/mol, preferably 1000 to 1 000 000 g/mol, more preferably 3000 to 300 000 g/mol.

The repeat units of the chemical structure (I) within the polymer are the same or at least partly different from one another. The repeat units of the chemical structure (II) within the polymer are the same or at least partly different from one another.

"At least partly different from one another" means that at least two repeat units differ from one another.

This means, especially in the case of the chemical structure (I), that at least two of the $n^1$ mutually joined repeat units differ in at least one of the $A^1$ to $A^6$, $R^1$ to $R^{18}$, $B^1$, $B^2$ radicals and/or in the value of $m^1$, $m^2$ and/or in the position of $A^2$, $A^3$, $A^6$ on the central phenyl ring.

This means, especially in the case of the chemical structure (II), that at least two of the $n^2$ mutually joined repeat units differ in at least one of the $A^7$ to $A^{12}$, $R^{19}$ to $R^{30}$, $B^3$ radicals and/or in the value of $m^3$.

At the same time, the repeat units of the chemical structure (I) within the polymer are joined to one another in such a way that the bond identified by "##" in a particular repeat unit is joined by the bond identified by "#" in the adjacent repeat unit and the bond identified by "§§" in a particular repeat unit is joined by the bond identified by "§" in the adjacent repeat unit.

At the same time, the repeat units of the chemical structure (II) within the polymer are joined to one another in such a way that the bond identified by "*" in a particular repeat unit is joined by the bond identified by "**" in the adjacent repeat unit.

The end groups of the first repeat unit of the polymer according to the invention which is present for these in the chemical structure (I) at the bonds defined by "#" and "$", and the end groups of the $n^1$th repeat unit of the polymer according to the invention which is present for these in the chemical structure (I) at the bonds defined by "#" and "##", are not particularly restricted and are a result of the polymerization method used in the method for preparing the polymer according to the invention. Thus, they may be termination fragments of an initiator or a repeat unit. Preferably, these end groups are selected from hydrogen, halogen, hydroxyl, unsubstituted radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

The end groups of the first repeat unit of the polymer according to the invention which is present for these in the chemical structure (II) at the bond defined by "*", and the end groups of the $n^2$th repeat unit of the polymer according to the invention which is present for these in the chemical structure (II) at the bond defined by "*", are not particularly restricted and are a result of the polymerization method used in the method for preparing the polymer according to the invention. Thus, they may be termination fragments of an initiator or a repeat unit. Preferably, these end groups are selected from hydrogen, halogen, hydroxyl, unsubstituted radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

In the case of $B^1$, "&&" denotes the bond pointing toward $A^5$. This is the chemical bond that joins $B^1$ to $A^6$. In the case of $B^1$, "&" denotes the bond pointing toward $R^5$. This is the other chemical bond in the chemical structure (I) that leads away from $B^1$, i.e. the chemical bond that joins $B^1$ to the carbon atom with pendant $R^5$.

In the case of $B^2$, "&&" denotes the bond pointing toward $A^6$. This is the chemical bond that joins $B^2$ to $A^6$. In the case of $B^2$, "&" denotes the bond pointing toward $R^6$. This is the other chemical bond in the chemical structure (I) that leads away from $B^2$, i.e. the chemical bond that joins $B^2$ to the carbon atom with pendant $R^6$.

In the case of $B^3$, "&&" denotes the bond pointing toward $A^7$. This is the chemical bond that joins $B^3$ to $A^7$. In the case of $B^3$, "&" denotes the bond pointing toward $R^{24}$. This is the other chemical bond in the chemical structure (II) that leads away from $B^3$, i.e. the chemical bond that joins $B^3$ to the carbon atom with pendant $R^{24}$.

In the case of $B^4$, "&&" denotes the bond pointing toward $A^{13}$. This is the chemical bond that joins $B^4$ to $A^{13}$. In the case of $B^4$, "&" denotes the bond pointing toward $R^{12}$ or $R^{14}$ or $R^{16}$ or $R^{18}$. This is the other chemical bond in the chemical structure (III) that leads away from $B^4$, i.e. the chemical bond that, when the chemical structure (III) is $R^{11}$, joins $B^4$ to the carbon atom with pendant $R^{12}$, or that, when the chemical structure (III) is $R^{13}$, joins $B^4$ to the carbon atom with pendant $R^{14}$, or that, when the chemical structure (III) is $R^{15}$, joins $B^4$ to the carbon atom with pendant $R^{16}$, or that, when the chemical structure (III) is $R^{17}$, joins $B^4$ to the carbon atom with pendant $R^{18}$.

"Optionally substituted by at least one group selected from nitro group, —NH$_2$, CN, SH, OH, halogen and optionally having at least one group selected from ether, thioether, amino ether, carbonyl group, carboxylic ester group, carboxamide group, sulphonic ester group, phosphoric ester" means that at least one hydrogen atom bonded to a carbon atom in the aliphatic radical may (but need not) be replaced by a group selected from nitro group, —NH$_2$, —CN, —SH, —OH, halogen and/or that, in the aliphatic radical, at least one CH$_2$ group joined to two sp$^3$-hybridized carbon atoms, preferably to two —CH$_2$— groups, more preferably to two —CH$_2$CH$_2$— groups, may (but need not) be replaced by an oxygen atom (in which case an ether group is present), a sulphur atom (in which case a thioether group is present), an NH or N-alkyl group (in which case an amino ether group is present), a —C(=O)— group (in which case a carbonyl group is present), a —C(=O)—O— group (in which case a carboxylic ester group is present), a —C(=O)NH— or —C(=O)—N(alkyl)- group (in which case a carboxamide group is present), an —SO$_2$—O— group (in which case a sulphonic ester is present), an —OPO$_2$—O— group (in which case a phosphoric ester is present).

An aliphatic radical in the context of the invention is an acyclic or cyclic, saturated or unsaturated, unbranched or branched hydrocarbyl group which is nonaromatic.

More particularly, this is understood in the context of the invention to mean a hydrocarbyl group selected from alkyl group, alkenyl group, alkynyl group and saturated or unsaturated cycloalkyl group.

In the context of the invention, an "alkyl group" is unbranched or branched and is a monovalent saturated hydrocarbyl radical having the general chemical structure (a) with

(a)

The chain of carbon atoms "—C$_w$H$_{2w+1}$" may be linear, in which case the group is an unbranched alkyl group. Alternatively, it may have branches, in which case it is a branched alkyl group.

In this case, w in the chemical structure (a) is an integer, especially from the range of 1 to 30, preferably from the range of 1 to 18, more preferably from the range of 1 to 12, even more preferably from the range of 1 to 10, even more preferably still from the range of 1 to 8, most preferably from the range of 1 to 6. w in an unbranched or branched alkyl group having 1 to 30 carbon atoms is selected from the range of 1 to 30. w in an unbranched or branched alkyl group having 1 to 18 carbon atoms is selected from the range of 1 to 18. w in an unbranched or branched alkyl group having 1 to 12 carbon atoms is selected from the range of 1 to 12. w in an unbranched or branched alkyl group having 1 to 10 carbon atoms is selected from the range of 1 to 10. w in an unbranched or branched alkyl group having 1 to 8 carbon atoms is selected from the range of 1 to 8. w in an unbranched or branched alkyl group having 1 to 6 carbon atoms is selected from the range of 1 to 6.

In the context of the invention, an "unbranched or branched alkyl group having 1 to 30 carbon atoms" is especially selected from methyl, ethyl, n-propyl, iso-propyl, n-butyl, sec-butyl, iso-butyl, tert-butyl, n-pentyl, 1-methylbutyl, 2-methylbutyl, 3-methyl butyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, n-pentacosyl, n-hexacosyl, n-heptacosyl, n-octacosyl, n-nonacosyl, n-triacontyl.

In the context of the invention, an "unbranched or branched alkyl group having 1 to 18 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl.

In the context of the invention, an "unbranched or branched alkyl group having 1 to 12 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl.

In the context of the invention, an "unbranched or branched alkyl group having 1 to 10 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2, 2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl.

In the context of the invention, an "unbranched or branched alkyl group having 1 to 8 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl.

In the context of the invention, an "unbranched or branched alkyl group having 1 to 6 carbon atoms" is especially selected from the group consisting of methyl, ethyl, n-propyl, iso-propyl, n-butyl, sec-butyl, iso-butyl, tert-butyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl.

According to the invention, an alkyl group having 1 to 30 carbon atoms is especially an alkyl group having 1 to 18, preferably 1 to 12, more preferably 1 to 10, even more preferably 1 to 8 and most preferably 1 to 6 carbon atoms.

According to the invention, an alkyl group having 1 to 6 carbon atoms is especially an alkyl group having 1 to 4 carbon atoms and even more preferably selected from methyl, ethyl, n-propyl, iso-propyl, n-butyl, sec-butyl, tert-butyl.

In the context of the invention, an "alkenyl group" is unbranched or branched and is obtained from an alkyl group by replacement of at least one CH—CH single bond in the alkyl group by a C=C double bond.

In the context of the invention, an "alkynyl group" is unbranched or branched and is obtained from an alkyl group by replacement of at least one $CH_2$—$CH_2$ single bond in the alkyl group by a C≡C triple bond or from an alkenyl group by replacement of at least one $CH_2$—$CH_2$ single bond and/or a CH=CH double bond in the alkenyl group by a C≡C triple bond in each case.

A saturated cycloalkyl group is an alkyl group in which 3 carbon atoms are present within a saturated ring, and may additionally also comprise further carbon atoms not present in the ring. It may be joined to the rest of the molecule via one of these ring carbon atoms or via carbon atoms that are not within the ring. In the context of the invention, a cycloalkyl group is especially selected from cyclopropyl, cyclobutyl, cyclopropylmethyl, cyclopentyl, cyclobutylmethyl, cyclohexyl, cycloheptyl, cyclooctyl, cyclononyl, cyclodecyl, cycloundecyl, cyclododecyl, cyclotridecyl, cyclotetradecyl, cyclopentadecyl.

An unsaturated cycloalkyl group (=cycloalkenyl or cycloalkynyl) is obtained from a saturated cycloalkyl group by replacement of at least one CH—CH single bond in the saturated cycloalkyl group by at least one C=C double bond (cycloalkenyl) and/or of a $CH_2$—$CH_2$ single bond with a C≡C triple bond (cycloalkynyl).

A (hetero)aromatic radical in the context of the invention is a heteroaromatic or aromatic radical.

An aromatic radical has exclusively carbon atoms and at least one aromatic ring. An aromatic radical is especially selected from aryl radical, aralkyl radical, alkaryl radical. Aryl radicals have exclusively aromatic rings and are joined to the molecule via a carbon atom in the aromatic ring. An aryl radical is preferably phenyl.

Alkyl radicals have at least one aromatic ring via which they are joined to the rest of the molecule and additionally also bear alkyl radicals on the aromatic ring. An alkaryl radical is preferably tolyl. Aralkyl radicals result in a formal sense from the replacement of a hydrogen atom in an alkyl group with an aromatic hydrocarbyl ring, preferably phenyl. An alkaryl radical is preferably benzyl, phenylethyl, α-methylbenzyl.

A heteroaromatic radical is especially selected from heteroaryl radical, heteroaralkyl radical, alkylheteroaryl radical. It is an aromatic radical which additionally has at least one heteroatom, especially a heteroatom selected from the group consisting of nitrogen, oxygen, sulphur, within the aromatic ring or, in the case of a heteroaralkyl radical or of an alkylheteroaryl radical, alternatively or additionally outside the aromatic ring.

Preferred (hetero)aromatic radicals are selected from the group consisting of a ring of the above identified chemical structure (III), azole, imidazole, pyrrole, pyrazole, triazole, tetrazole, thiophene, furan, thiazole, thiadiazole, oxazole, oxadiazole, pyridine, pyrimidine, triazine, tetrazine, thiazine, benzofuran, purine, indole, 9-anthryl, 9-phenanthryl.

The polymers according to the invention can be prepared in a simple and uncomplicated manner, and from readily obtainable starting materials. Depending on the type of polymerization used, some of the monomers can be prepared from starting materials available commercially at very low cost in just one synthesis stage without chromatographic separation methods, which offers a distinct advance over preparation methods known in the technical literature. No further monomer is needed for the polymerization, and the polymerization does not require any costly metal catalysts; instead, it is possible to use simple polymerization processes as the production method. At the same time, it is possible to obtain polymers having a high molar mass in very high yields. The introduction of polymerizable groups of low molar mass makes it possible to keep the molar mass of the monomer low and to maximize the theoretical capacity (which is inversely proportional to the molar mass) of the secondary electrical charge storage means. In addition, the redox active groups in these polymers are not conjugated to one another; as a consequence, the electrical charge storage means has a flat charging/discharging plateau. These materials differ from the prior art by a very simple synthesis from starting materials available commercially at very low costs in just one synthesis stage in some cases, without chromatographic separation methods. Furthermore, the high redox potential of the polymers according to the invention enables higher cell voltages and energy densities than in the known systems and allows higher discharge voltages.

The polymers according to this invention may either be homopolymers or copolymers. Homopolymers are polymers which have been synthesized only from one monomer. Copolymers are polymers which have been synthesized from two or more monomers. If two or more monomers are used in the synthesis, the monomers of the repeat units of the polymers, according to this invention, may be present in the polymer in random distribution, as blocks or in alternation. The polymers according to this invention may be present either in linear form (as in structure (II)] or in crosslinked form (as in structure (I)].

The polymers of the invention can be synthesized by anionic, cationic or free-radical polymerization, as known to those skilled in the art, of a compound of the structure (I)' or (II)' below and optionally also with a structure (III)' below. In the structures (I)' or (II)', the $R^{1'}$ to $R^{10'}$ and $R^{19'}$ to $R^{30'}$, $B^{1'}$ to $B^{3'}$ and $A^{1'}$ to $A^{12'}$ radicals are each as defined above for $R^1$ to $R^{10}$ and $R^{19}$ to $R^{30}$, $B^1$ to $B^3$ and $A^1$ to $A^{12}$.

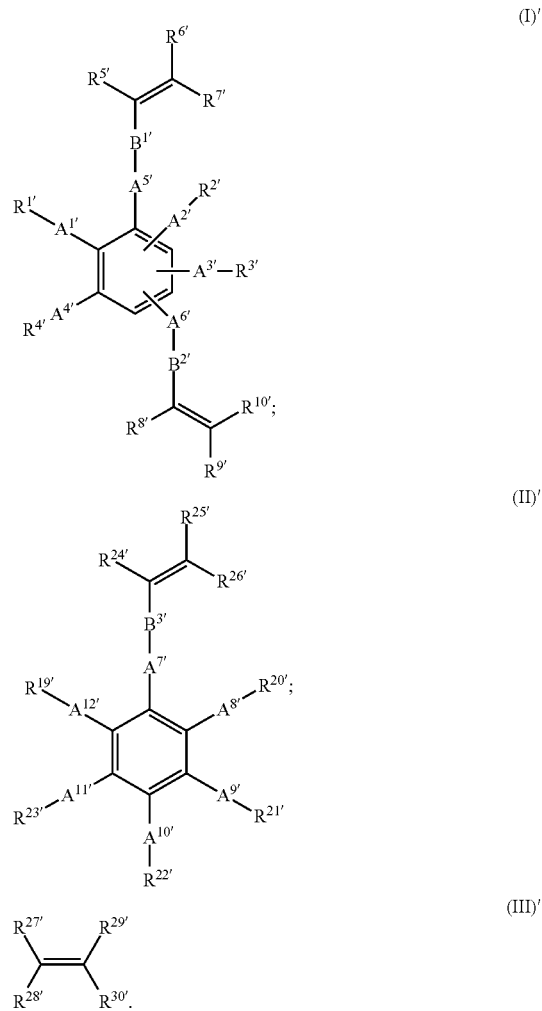

A polymer of the structure (I) can be obtained here by an anionic, cationic or free-radical polymerization in which exclusively monomers of the structure (I)' are used, such that the polymer of the structure (I) obtained is a homopolymer in which $m^1=m^2=0$.

A polymer of the structure (I) can be obtained here by an anionic, cationic or free-radical polymerization in which monomers of the structure (I)' and (II)' are used, such that the polymer of the structure (I) obtained is a copolymer in which $m^1$, $m^2 \geq 0$ and the $R^{11}$, $R^{13}$, $R^{15}$ or $R^{17}$ radicals in the above structure (I) are each independently a group of the aforementioned general structure (III).

A polymer of the structure (I) can be obtained here by an anionic, cationic or free-radical polymerization in which monomers of the structure (I)' and (III)' are used, such that the polymer of the structure (I) obtained is a copolymer in which $m^1$, $m^2 \geq 0$ and the $R^{11}$, $R^{13}$, $R^{15}$, $R^{17}$ radicals in the above structure (I) cannot be a group of the general structure (III).

A polymer of the structure (I) can be obtained here by an anionic, cationic or free-radical polymerization in which monomers of the structure (I)', (II)' and (III)' are used, such that the polymer of the structure (I) obtained is a copolymer in which $m^1$, $m^2 \geq 0$ and the $R^{11}$, $R^{13}$, $R^{15}$, $R^{17}$ radicals in the above structure (I) may each independently also be a group of the aforementioned general structure (III).

A polymer of the structure (II) can be obtained here by an anionic, cationic or free-radical polymerization in which exclusively monomers of the structure (II)' are used, such that the polymer of the structure (II) obtained is a homopolymer in which $m^3=0$.

A polymer of the structure (II) can be obtained here by an anionic, cationic or free-radical polymerization in which monomers of the structure (II)' and (III)' are used, such that the polymer of the structure (II) obtained is a copolymer in which $m^3 \geq 0$.

The compounds of the structures (I)' and (II)' are available to the person skilled in the art via known methods, for example by reaction of a dihydroxybenzene or dihalobenzene with vinyl acetate or a haloalkane, as outlined in the scheme below (Synthesis Scheme 1). The examples are shown on the basis of the abovementioned structure (I)' but apply correspondingly to the synthesis of a compound of the abovementioned structure (II)'. $R^A$, $R^B$, $R^C$, $R^D$ correspond to $A^{1'}-R^{1'}$, $A^{2'}-R^{2'}$, $A^{3'}-R^{3'}$, $A^{4'}-R^{4'}$ from the structure (I)'; Ar denotes an aromatic 3-membered ring, 5-membered ring or 6-membered ring, e.g. phenylene.

Synthesis Scheme 1

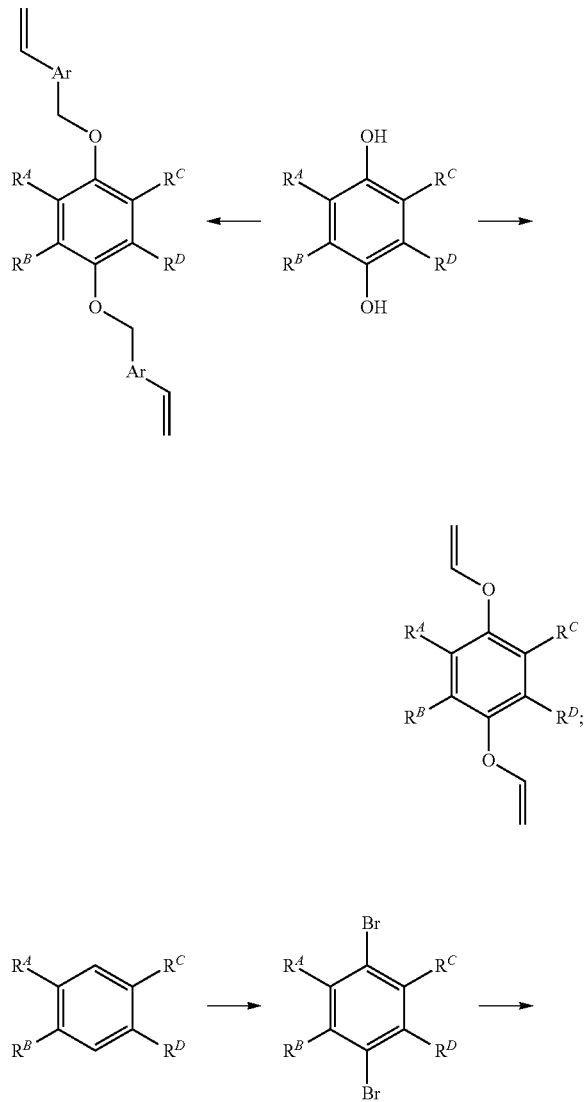

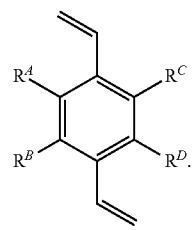

The inventive polymers according to the chemical structures (I) and (II) can be synthesized from the respective monomers (I)', (II)' and (III)' by polymerization methods familiar to the person skilled in the art, such as cationic polymerization (analogously to polyvinyl ethers), free-radical polymerization (analogously to polystyrene) or anionic polymerization.

The cationic polymerization is preferably conducted within a temperature range from −30 to 150° C., advantageously within a temperature range from −20 to 50° C., in a solvent and a reaction time of 0.1 to 100 hours, using a catalyst, for example Lewis acids or protic acids, preferably sulphuric acid, nitric acid, perchloric acid, boron trifluoroetherate complex, aluminium trichloride, tin tetrachloride or titanium tetrachloride. There is no restriction in respect of solvents used. Preference is given to organic solvents, for example N,N-dimethylformamide, N,N'-dimethylacetamide, dimethyl sulphoxide, N-methylpyrrolidone, dichloromethane, tetrahydrofuran, 1,4-dioxolane, 1,2-dichloroethane, toluene, xylene, chlorobenzene, o-dichlorobenzene.

The free-radical polymerization may be selected from the group consisting of controlled radical polymerization methods, for example reversible addition-fragmentation chain transfer polymerization (RAFT), atom transfer radical polymerization (ATRP) or nitroxide-mediated polymerization (NMP), within a temperature range from −30 to 150° C., advantageously within a temperature range from 40 to 120° C., in a solvent and in a reaction time of 0.1 to 100 hours, using an initiator, for example azo compounds or peroxides, preferably benzoyl peroxide or 2,2'-azobisisobutyronitrile. There is no restriction in respect of solvents used. Preference is given to organic solvents, for example N,N'-dimethylformamide, N,N'-dimethylacetamide, dimethyl sulphoxide, N-methylpyrrolidone, dichloromethane, tetrahydrofuran, 1,4-dioxolane, 1,2-dichloroethane, toluene, xylene, chlorobenzene, o-dichlorobenzene.

The anionic polymerization is preferably conducted within a temperature range from −78 to 150° C., advantageously within a temperature range from −50 to 50° C., in a solvent and a reaction time of 0.1 to 100 hours, using a catalyst, for example Lewis bases or bases, preferably metal amides such as sodium amide and $LiC_2H_5$, alkoxides such as methoxide or ethoxide, hydroxides such as sodium hydroxide or potassium hydroxide, cyanides, phosphines, amines or organometallic compounds, for example n-butyllithium or vinylmagnesium bromide. There are no restrictions in respect of solvents used. Preference is given to organic solvents, for example tetrahydrofuran, 1,4-dioxolane, diethyl ether, tert-butyl methyl ether, toluene, xylene, chlorobenzene or o-dichlorobenzene.

It has been found to be advantageous to conduct the cationic, anionic or free-radical polymerization in the presence of conductivity additives, for example the carbon materials described hereinafter (including carbon black, for example "SuperP®"), as described for other polymers in A.

Vlad, J. Rolland, G. Hauffman, B. Ernould, J.-F. Gohy, ChemSusChem 2015, 8, 1692-1696.

Alternatively, the inventive polymers of the chemical structures (I) and (II) can also be prepared by polymer-analogous reactions. This can be done by reacting a compound of the following structure (I)" or (II)" with a polymeric structure (III)".

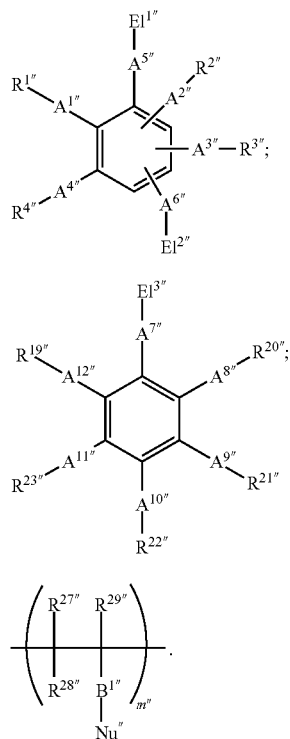

Synthesis Scheme 2

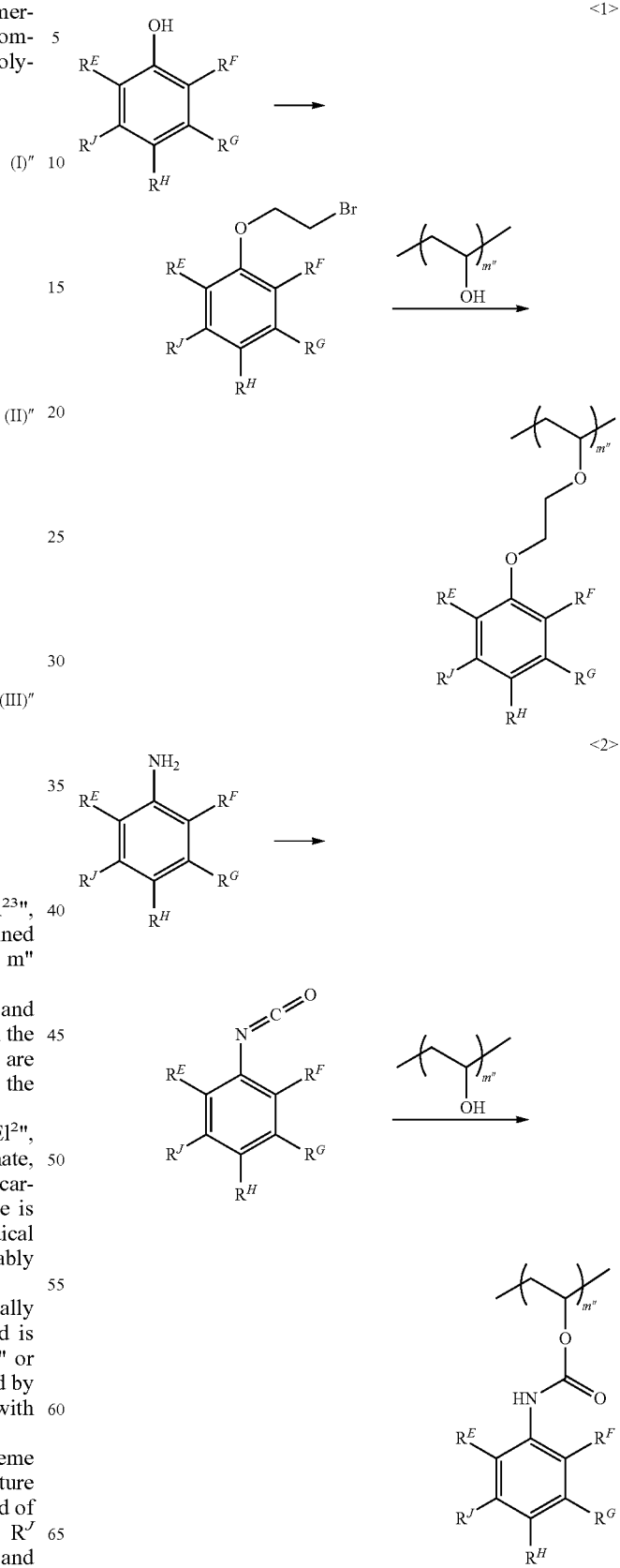

In the structures (I)" or (II)", the $R^{1\prime\prime}$ to $R^{4\prime\prime}$, $R^{19\prime\prime}$ to $R^{23\prime\prime}$, $R^{27\prime\prime}$ to $R^{29\prime\prime}$ and $A^{1\prime\prime}$ to $A^{12\prime\prime}$ radicals are each as defined above for $R^1$ to $R^4$, $R^{19}$ to $R^{23}$, $R^{27}$ to $R^{29}$ and $A^1$ to $A^{12}$. m" is as defined for $m^3$.

Nu" is a nucleophilic group, preferably hydroxyl, and $El^{1\prime\prime}$, $El^{2\prime\prime}$, $El^{3\prime\prime}$ are each electrophilic organic groups. In the case that $A^{5\prime\prime}$, $A^{6\prime\prime}$, $A^{7\prime\prime}$ is oxygen, $El^{1\prime\prime}$, $El^{2\prime\prime}$, $El^{3\prime\prime}$ are preferably each a monovalent haloalkyl radical where the halogen is preferably chlorine, bromine or iodine.

In the case that $A^{5\prime\prime}$, $A^{6\prime\prime}$, $A^{7\prime\prime}$ is a direct bond, $El^{1\prime\prime}$, $El^{2\prime\prime}$, $El^{3\prime\prime}$ are preferably each a group selected from isocyanate, carboxylic acid, carbonyl group, carboxylic anhydride, carbonyl halide (where the halogen in the carbonyl halide is preferably chlorine, bromine or iodine), haloalkyl radical (where the halogen in the haloalkyl radical is preferably chlorine, bromine or iodine).

$A^{5\prime\prime}$-$El^{1\prime\prime}$, $A^{6\prime\prime}$-$El^{2\prime\prime}$, $A^{7\prime\prime}$-$El^{3\prime\prime}$ are each nucleophilically attacked by the Nu" group and hence a covalent bond is established between the compound of the structure (I)" or (II)" and (III)". $B^{1\prime\prime}$ is defined such that the group formed by the reaction between $El^{1\prime\prime}$, $El^2$, $El^{3\prime\prime}$ and Nu", together with $B^{1\prime\prime}$, is as defined for $B^1$, $B^2$ and $B^3$.

The examples which follow (shown in Synthesis Scheme 2) are shown with reference to the abovementioned structure (II)", but correspondingly for the reaction of a compound of the abovementioned structure (I)". $R^E$, $R^F$, $R^G$, $R^H$, $R^J$ correspond to $A^{12\prime\prime}$-$R^{19\prime\prime}$, $A^{8\prime\prime}$-$R^{20\prime\prime}$, $A^{9\prime\prime}$-$R^{21\prime\prime}$, $A^{10\prime\prime}$-$R^{22\prime\prime}$ and $A^{11\prime\prime}$-$R^{23\prime\prime}$ from the structure (II)".

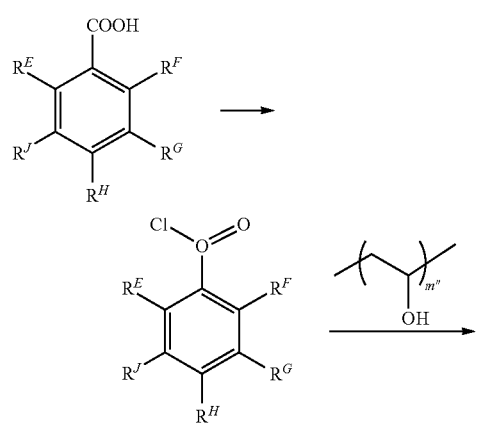
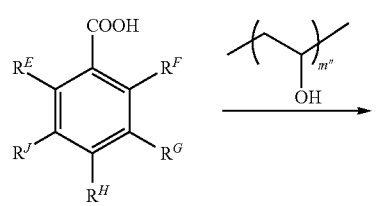
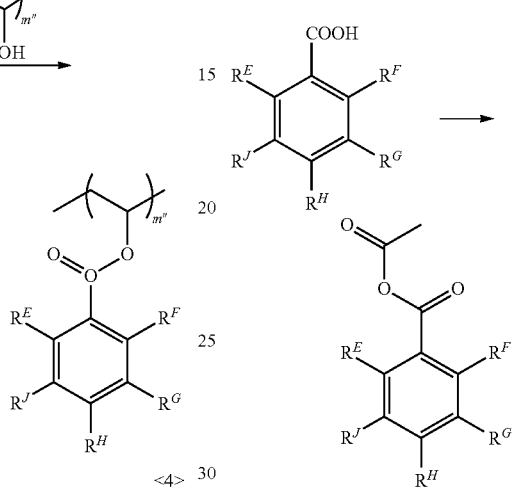
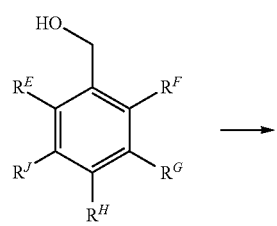
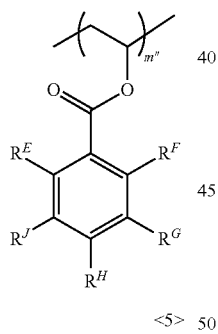
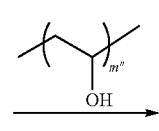

<3>

<4>

<5>

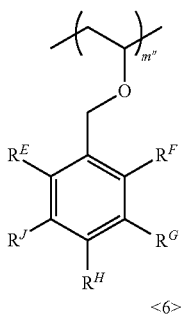

<6>

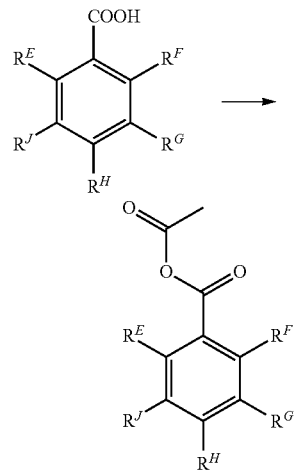

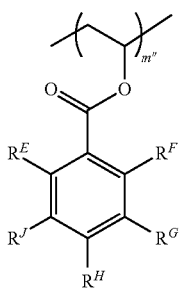

The reaction conditions that are to be employed in the aforementioned reactions <1>-<6> from Synthesis Scheme 2 are familiar to those skilled in the art.

In the case that $A^{7''}$ in the general formula (II)'' corresponds to a direct bond and $El^{3''}$ to an isocyanate group, the reaction with the polymeric compound can be conducted by a known method for synthesis of urethanes and derivatives thereof (see Synthesis Scheme 2, reaction <2>). In that case, the reaction is preferably conducted within a temperature range from −78 to 150° C., advantageously within a temperature range from −40 to 120° C., and in a solvent and in a reaction time of 0.1 to 100 hours. There are no restrictions in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

In the case that $A^{7''}$ in the general formula (II)'' corresponds to a direct bond and $El^{3''}$ to a carbonyl halide group, the reaction with the polymeric compound can be conducted by a known method for synthesis of carboxylic esters and derivatives thereof (see Synthesis Scheme 2, reaction <3>). In that case, the reaction is preferably conducted within a temperature range from −78 to 150° C., advantageously within a temperature range from −40 to 120° C., and in a solvent and in a reaction time of 0.1 to 100 hours, using a catalyst, for example a pyridine derivative such as typically 4-(dimethylamino)pyridine, or a carbodiimide derivative such as typically N,N'-dicyclohexylcarbodiimide. There are no restrictions in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

In the case that $A^{7\prime\prime}$ in the general formula (II)" corresponds to a direct bond and $El^{3\prime\prime}$ to a carboxylic acid group, the reaction with the polymeric compound can be conducted by a known method for synthesis of carboxylic esters and derivatives thereof (see Synthesis Scheme 2, reaction <4>). In that case, the reaction is preferably conducted within a temperature range from −78 to 150° C., advantageously within a temperature range from −40 to 120° C., and in a solvent and in a reaction time of 0.1 to 100 hours, using a catalyst, for example a pyridine derivative such as typically 4-(dimethylamino)pyridine, or a carbodiimide derivative such as typically N,N'-dicyclohexylcarbodiimide. There are no restrictions in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

In the case that $A^{7\prime\prime}$ in the general formula (II)" corresponds to a direct bond and $El^{3\prime\prime}$ to a haloalkyl radical, the reaction with the polymeric compound can be conducted by a known method for synthesis of ethers and derivatives thereof (see Synthesis Scheme 2, reaction <5>; analogous conditions apply when $El^{3\prime\prime}$=benzyl halide group, not shown in Synthesis Scheme 2). In that case, the reaction is preferably conducted within a temperature range from −78 to 150° C., advantageously within a temperature range from −40 to 120° C., in a solvent and in a reaction time of 0.1 to 100 hours, using a catalyst, for example a base such as sodium hydride, sodium hydroxide, potassium tert-butoxide, 1,8-diazabicyclo[5.4.0]undec-7-ene or 1,5-diazabicyclo[4,3,0]non-5-ene. There are no restrictions in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

In the case that $A^{7\prime\prime}$ in the general formula (II)" corresponds to a direct bond and $El^{3\prime\prime}$ to a carboxylic anhydride group, the reaction with the polymeric compound can be conducted by a known method for synthesis of carboxylic esters and derivatives thereof (see Synthesis Scheme 2, reaction <6>). In that case, the reaction is preferably conducted within a temperature range from −78 to 150° C., advantageously within a temperature range from −40 to 120° C., in a solvent and in a reaction time of 0.1 to 100 hours, using a catalyst, for example a pyridine derivative such as typically 4-(dimethylamino)pyridine, or a carbodiimide derivative such as typically N,N'-dicyclohexylcarbodiimide. There are barely any restrictions for solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

In the polymer-analogous reaction, it is also possible to react a compound of the following structure (1)''' or (II)''' with a polymeric structure (III)'''.

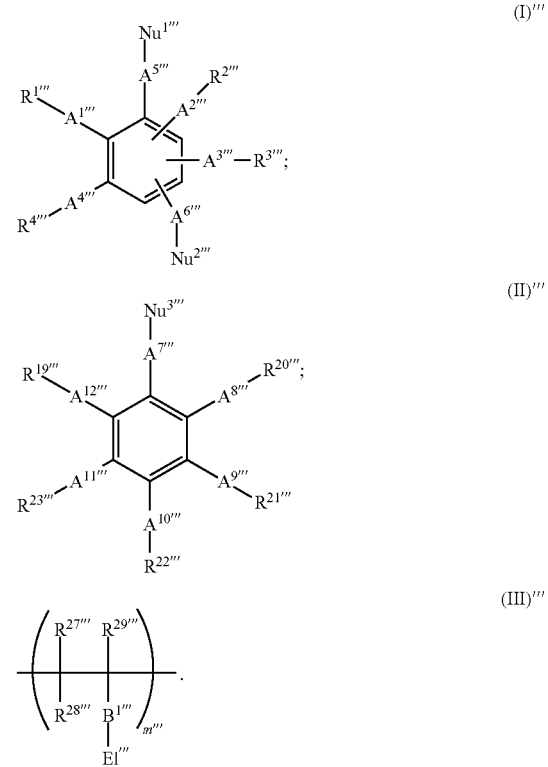

In the structures (I)''' or (II)''', the $R^{1\prime\prime\prime}$ to $R^{4\prime\prime\prime}$, $R^{19\prime\prime\prime}$ to $R^{23\prime\prime\prime}$, $R^{27\prime\prime\prime}$ to $R^{29\prime\prime\prime}$ and $A^{1\prime\prime\prime}$ to $A^{12\prime\prime\prime}$ radicals are each as defined above for $R^1$ to $R^4$, $R^{19}$ to $R^{23}$, $R^{27}$ to $R^{29}$ and $A^1$ to $A^{12}$. m''' is as defined for $m^3$.

$A^{5\prime\prime\prime}$-$Nu^{1\prime\prime\prime}$, $A^{6\prime\prime\prime}$-$Nu^{2\prime\prime\prime}$, $A^{7\prime\prime\prime}$-$Nu^{3\prime\prime\prime}$ are nucleophilic groups. In the case that $A^{5\prime\prime\prime}$, $A^{6\prime\prime\prime}$, $A^{7\prime\prime\prime}$ is oxygen, $Nu^{1\prime\prime\prime}$, $Nu^{2\prime\prime\prime}$, $Nu^{3\prime\prime\prime}$ are preferably each a hydrogen radical. In the case that $A^{5\prime\prime\prime}$, $A^{6\prime\prime\prime}$, $A^{7\prime\prime\prime}$ is a direct bond, $Nu^{1\prime\prime\prime}$, $Nu^{2\prime\prime\prime}$, $Nu^{3\prime\prime\prime}$ are preferably each a hydroxyalkyl or thioalkyl group.

El''' is an electrophilic organic group, preferably haloalkyl, more preferably chloroalkyl, bromoalkyl or iodoalkyl, especially chloroalkyl, or when $B^{1\prime\prime\prime}$=direct bond is also a halogen radical.

El''' is nucleophilically attacked in each case by the $A^{5\prime\prime\prime}$-$Nu^{1\prime\prime\prime}$, $A^{6\prime\prime\prime}$-$Nu^{2\prime\prime\prime}$ or $A^{7\prime\prime\prime}$-$Nu^{3\prime\prime\prime}$ and hence a covalent bond is established between the compound of the structure (I)''' or (II)'' and (III)'''. $B^{1\prime\prime\prime}$ is otherwise defined such that the group formed by the reaction between $El^{1\prime\prime\prime}$, $El^{2\prime\prime\prime}$, $El^{3\prime\prime\prime}$ and Nu''', together with $B^{1\prime\prime\prime}$, is as defined for $B^1$, $B^2$ and $B^3$.

The examples which follow (shown in Synthesis Scheme 3) are shown with reference to the abovementioned structure (II)''', but correspondingly for the reaction of a compound of the abovementioned structure (I)'''. $R^K$, $R^L$, $R^M$, $R^N$, $R^P$ correspond to $A^{12\prime\prime\prime}$-$R^{19\prime\prime\prime}$, $A^{8\prime\prime\prime}$-$R^{20\prime\prime\prime}$, $A^{9\prime\prime\prime}$-$R^{21\prime\prime\prime}$, $A^{10\prime\prime\prime}$-$R^{22\prime\prime\prime}$ and $A^{11\prime\prime\prime}$-$R^{23\prime\prime\prime}$ from the structure (II)'''.

The reaction conditions that are to be employed in the reactions <1>-<4> mentioned below from Synthesis Scheme 3 are familiar to those skilled in the art.

Synthesis Scheme 3

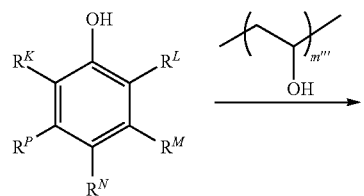
<1>

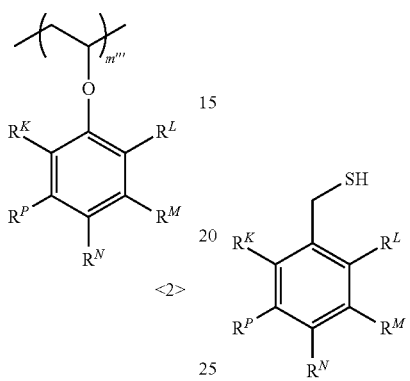
<2>

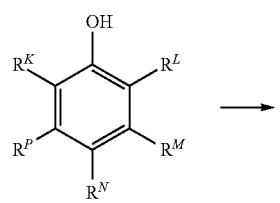

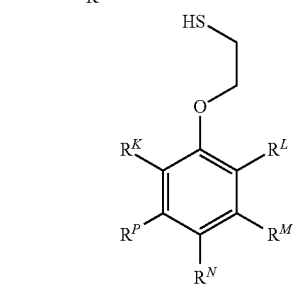
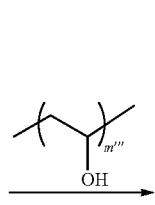
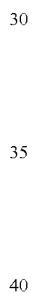
<3>

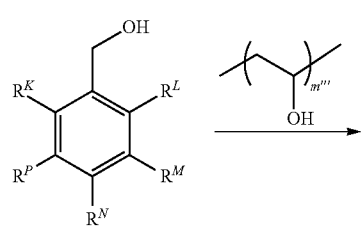
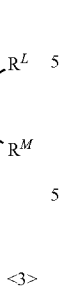

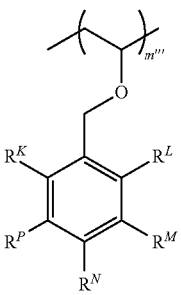
<4>

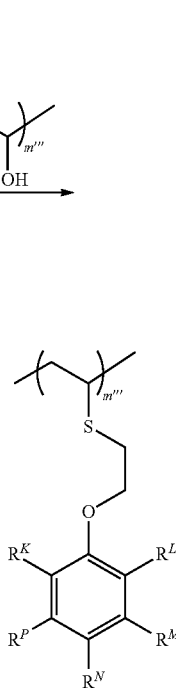

In the case in which $A^{7'''}$-$Nu^{3'''}$ in the general formula (II)''' is a hydroxyl group (Synthesis Scheme 3, reaction <1>) or a thioalkoxy group (Synthesis Scheme 3, reaction <2>) and $El^{3'''}$ is likewise a hydroxyl group, the reaction with the polymeric compound can be conducted by a known method of synthesis of ethers and derivatives thereof. In that case, the reaction is preferably conducted within a temperature range from −78 to 150° C., advantageously within a temperature range from −40 to 120° C., in a solvent and in a reaction time of 0.1 to 100 hours, using a catalyst, for example a base such as sodium hydride, sodium hydroxide, potassium tert-butoxide, 1,8-diazabicyclo[5.4.0]undec-7-ene or 1,5-diazabicyclo[4,3,0]non-5-ene. There are no restrictions in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

It is likewise also possible, in the polymer-analogous reaction, to react an azide with a polyalkyne (Synthesis Scheme 4). m''' therein is as defined for $m^3$. $R^K$, $R^L$, $R^M$, $R^N$, $R^P$ are as defined at the outset.

Synthesis Scheme 4

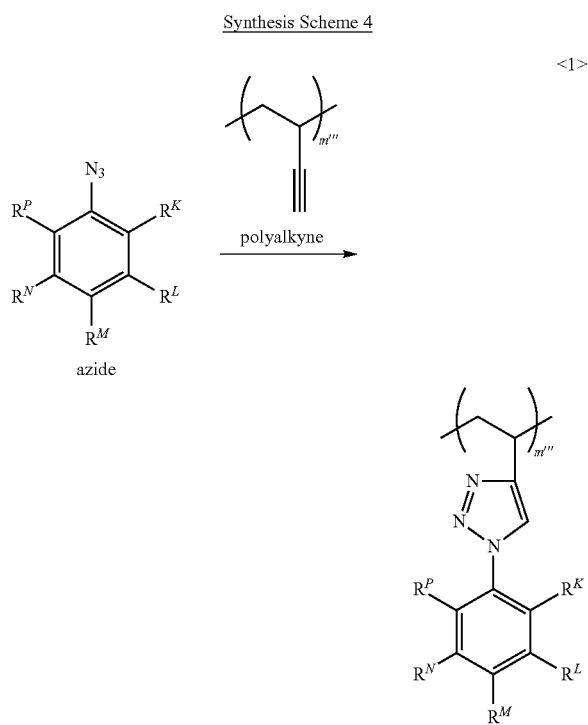

The reaction with the polyalkyne can be conducted by a known method of azide/alkyne click reaction and derivatives thereof (see Synthesis Scheme 4, reaction <1>). Preferably, the abovementioned compounds are synthesized within a temperature range from −78 to 150° C., advantageously within a temperature range from −40 to 120° C., in a solvent and in a reaction time of 0.1 to 100 hours. There is no restriction in respect of solvents used. Preference is given to aprotic organic solvents, for example N,N'-dimethylformamide, N,N'-dimethylacetamide, dimethyl sulphoxide, N-methylpyrrolidone, dichloromethane, 1,2-dichloroethane, toluene, xylene, chlorobenzene or o-dichlorobenzene.

The polymer according to the invention it especially suitable for use as redox-active electrode material in an electrical charge storage means, preferably for storage of electrical energy, and more preferably as a positive electrode element.

More preferably, the redox-active electrode material takes the form of an at least partial surface coating of electrode elements for electrical charge storage means, especially secondary batteries. Electrode elements here comprise at least one surface layer and one substrate.

A redox-active material for storage of electrical energy is a material which can store electrical charge and release it again, for example by accepting and releasing electrons. This material can be used, for example, as an active electrode material in an electrical charge storage means. Such electrical charge storage means for storage of electrical energy are especially selected from the group consisting of secondary batteries (also called "accumulators"), redox flow batteries, supercapacitors, and preferably secondary batteries.

Preferably, the electrical charge storage means is a secondary battery. A secondary battery comprises a negative electrode and a positive electrode which are separated from one another by a separator, and an electrolyte which surrounds the electrodes and the separator.

The separator is a porous layer which is ion-permeable and enables the balancing of the charge. The task of the separator is to separate the positive electrode from the negative electrode and to enable balancing of charge through permutation of ions. The separator used in the secondary battery is especially a porous material, preferably a membrane consisting of a polymeric compound, for example polyolefin, polyamide or polyester. In addition, it is possible to use separators made from porous ceramic materials.

The main task of the electrolyte is to assure ion conductivity, which is needed to balance the charge. The electrolyte of the secondary battery may be either a liquid or an oligomeric or polymeric compound having high ion conductivity ("gel electrolyte" or "solid state electrolyte"). Preference is given, however, to an oligomeric or polymeric compound.

If the electrolyte is liquid, it is especially composed of one or more solvents and one or more conductive salts.

The solvent of the electrolytes preferably independently comprises one or more solvents having a high boiling point and high ion conductivity but low viscosity, for example acetonitrile, dimethyl sulphoxide, ethylene carbonate, propylene carbonate, dimethyl carbonate, diethyl carbonate, methyl ethyl carbonate, γ-butyrolactone, tetrahydrofuran, dioxolane, 1,2-dimethoxymethane, 1,2-dimethoxyethane, diglyme, triglyme, tetraglyme, ethyl acetate, 1,3-dioxolane or water.

The conductive salt in the electrolyte consists of a cation of the formula $M^{e+}$ and an anion of the formula $An^{f-}$ of the formula $(M^{e+})_a(An^{f-})_b$ where e and f are integers depending on the charge of M and An; a and b are integers which represent the molecular composition of the conductive salt.

Cations used in the abovementioned conductive salt are positively charged ions, preferably metals of the first and second main groups, for example lithium, sodium, potassium or magnesium, but also other metals of the transition groups, such as zinc, and organic cations, for example quaternary ammonium compounds such as tetraalkylammonium compounds. The preferred cation is lithium.

Anions used in said conductive salt are preferably inorganic anions such as hexafluorophosphate, tetrafluoroborate, triflate, hexafluoroarsenate, hexafluoroantimonate, tetrafluoroaluminate, tetrafluoroindate, perchlorate, bis(oxalato)borate, tetrachloroaluminate, tetrachlorogallate, but also organic anions, for example $N(CF_3SO_2)_2^-$, $CF_3SO_3^-$, alkoxides, for example tert-butoxide or iso-propoxide, but also halides such as fluoride, chloride, bromide and iodide. The preferred anion is perchlorate, $ClO_4^-$.

The preferred conductive salt is thus $LiClO_4$.

If ionic liquids are used, they can be used either as solvent of the electrolyte, as conductive salt, or else as complete electrolyte.

In the embodiment in which the redox-active electrode material takes the form of an at least partial surface coating of electrode elements for electrical charge storage means, especially secondary batteries, an electrode element has an at least partial layer on a substrate surface. This layer especially comprises a composition comprising the polymer according to the invention as redox-active material for charge storage and especially at least also a conductivity additive and especially also at least one binder additive.

The application of this composition (another expression for composition: "composite") on the substrate is possible by means of methods known to those skilled in the art. More particularly, the polymer according to the invention is applied on the substrate with the aid of an electrode slurry.

The substrate of the electrode element is especially selected from conductive materials, preferably metals, carbon materials, oxide substances.

Preferred metals are selected from platinum, gold, iron, copper, aluminium or a combination of these metals. Preferred carbon materials are selected from glassy carbon, graphite film, graphene, carbon sheets. Preferred oxide substances are, for example, selected from the group consisting of indium tin oxide (ITO), indium zinc oxide (IZO), antimony zinc oxide (AZO), fluorine tin oxide (FTO) or antimony tin oxide (ATO).

The surface layer of the electrode element comprises at least the polymer according to the invention as redox active material for charge storage and especially at least a conductivity additive and a binder additive.

The conductivity additive is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (=PEDOT:PSS), polyarcenes.

Binder additives are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

The polymer according to the invention is especially applied to the substrate of the electrode element in an electrode slurry.

The electrode slurry is a solution or suspension and comprises the polymer according to the invention and especially the above-described conductivity additive and the above-described binder additive.

The electrode slurry preferably comprises a solvent and further constituents comprising redox-active material for storage of electrical energy (which is especially the polymer according to the invention), and preferably also the conductivity additive and the binder additive.

In the further constituents, preferably, the proportion of the redox-active material for storage of electrical energy (which is especially the polymer according to the invention) is from 5 to 100 percent by weight, the proportion of the conductivity additive from 0 to 80 and preferably 5 to 80 percent by weight, and the proportion of binder additive 0 to 10 and preferably 1 to 10 percent by weight, where the sum total is 100 percent by weight.

Solvents used for the electrode slurry are independently one or more solvents, preferably solvents having a high boiling point, more preferably selected from the group consisting of N-methyl-2-pyrrolidone, water, dimethyl sulphoxide, ethylene carbonate, propylene carbonate, dimethyl carbonate, methyl ethyl carbonate, γ-butyrolactone, tetrahydrofuran, dioxolane, sulpholane, N,N'-dimethylformamide, N,N'-dimethylacetamide. The concentration of the redox-active material, especially of the polymer according to the invention, for storage of electrical energy in the abovementioned electrode slurry is preferably between 0.1 and 10 mg/ml, more preferably between 0.5 and 5 mg/ml.

If the polymer of this invention as redox-active material is used as positive electrode element for electrical charge storage means, the redox-active material used for electrical charge storage in the negative electrode is a material which exhibits a redox reaction at a lower electrochemical potential than the polymer of this invention. Preference is given to those materials selected from the group consisting of carbon materials, which are especially selected from the group consisting of graphite, graphene, carbon black, carbon fibres, carbon nanofibres, metals or alloys, which are especially selected from the group consisting of lithium, sodium, magnesium, lithium-aluminium, Li—Si, Li—Sn, Li—Ti, Si, SiO, $SiO_2$, Si—$SiO_2$ complex, Zn, Sn, SnO, $SnO_2$, PbO, $PbO_2$, GeO, $GeO_2$, $WO_2$, $MoO_2$, $Fe_2O_3$, $Nb_2O_5$, $TiO_2$, $Li_4Ti_5O_{12}$, and $Li_2Ti_3O_7$, and organic redox-active materials. Examples of organic redox-active materials are compounds having a stable organic radical, compounds having an organosulphur unit, having a quinone structure, compounds having a dione system, conjugated carboxylic acids and salts thereof, compounds having a phthalimide or naphthalimide structure, compounds having a disulphide bond and compounds having a phenanthrene structure and derivatives thereof. If an abovementioned redox-active oligomeric or polymeric compound is used in the negative electrode, this compound may also be a composite, i.e. a composition, consisting of this oligomeric or polymeric compound, a conductivity additive and a binder additive in any ratio.

The conductivity additive in this case too is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (="PEDOT:PSS"), polyarcenes. Binder additives in this case too are especially materials having binder properties and are preferably polymers selected from the group consisting of polytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

This composite may, as described above, be present as a layer on a substrate through a known film-forming process with the aid of an electrode slurry.

FIGURES

Figure 3:
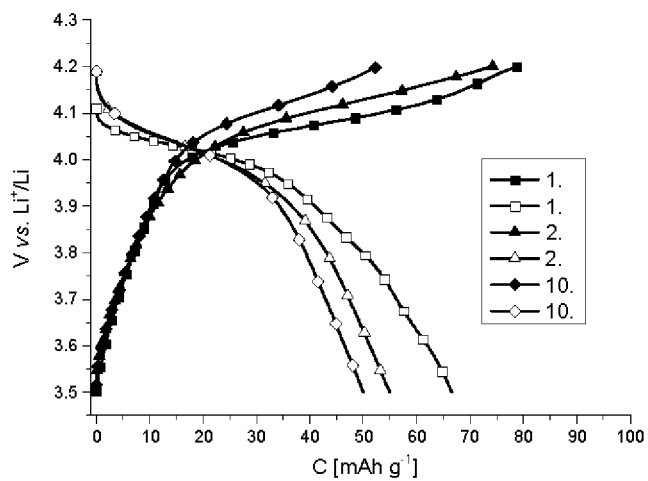

FIG. 3 (=FIG. 3) indicates the measured voltages V (y axis) against the capacity (x axis) of an electrode according to the invention produced with 6 after 1 or 2 or 10 charge-discharge cycle(s) (charging rate=1 C, i.e. full charge within 60 minutes; section 4.1). The filled boxes in the diagram correspond to the charging cycles, the empty boxes to the discharging cycles.

Figure 4:
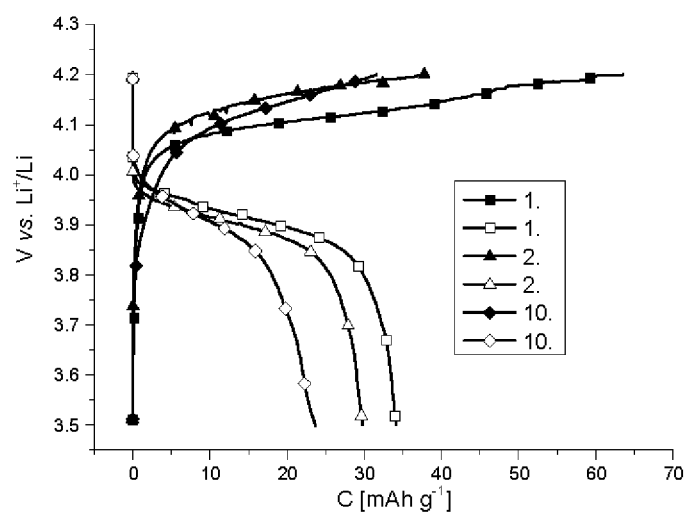

FIG. 4 (=FIG. 4) indicates the measured voltages V (y axis) against the capacity (x axis) of an electrode not according to the invention produced with 13 after 1 or 2 or 10 charge-discharge cycle(s) (charging rate=1 C, i.e. full charge within 60 minutes; section 4.2). The filled boxes in the diagram correspond to the charging cycles, the empty boxes to the discharging cycles.

Figure 5:
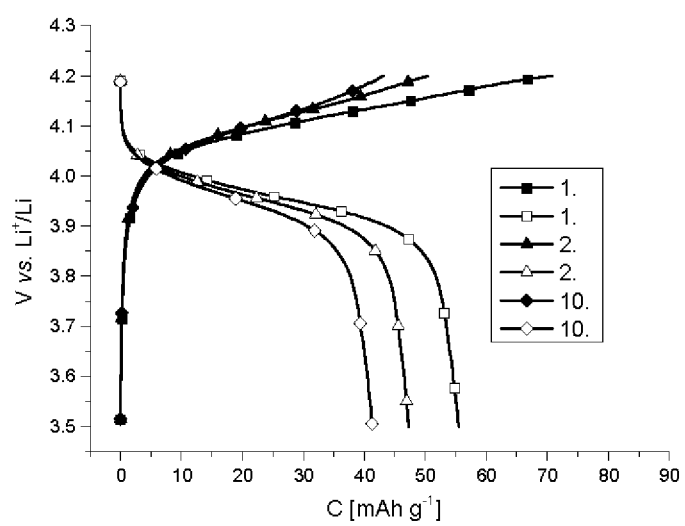

FIG. 5 (=FIG. 5) indicates the measured voltages V (y axis) against the capacity (x axis) of an electrode not according to the invention produced with 16 after 1 or 2 or 10 charge-discharge cycle(s) (charging rate=1 C, i.e. full charge within 60 minutes; section 4.3). The filled boxes in the diagram correspond to the charging cycles, the empty boxes to the discharging cycles.

The examples which follow are intended to elucidate the present invention without limiting said invention in any way.

EXAMPLES

1. General Remarks

1.1 Abbreviations

AIBN—azobis(isobutyronitrile); DMAP—dimethylaminopyridine; DMF—dimethylformamide; NEt$_3$—triethylamine; TBAClO$_4$—tetrabutylammonium perchlorate; TBAPF$_6$—tetrabutylammonium hexafluorophosphate; THF—tetrahydrofuran; Tol.—toluene.

The numbers in brackets given in the reaction schemes which follow relate to the respective section in which the synthesis has been described.

1.2 Test Methods $^1$H and $^{13}$C NMR spectra were recorded with a Bruker AC 300 (300 MHz) spectrometer at 298 K. For cyclic voltammetry and galvanostatic experiments, a Biologic VMP 3 potentiostat was available. Size exclusion chromatography was conducted on an Agilent 1200 series system (degasser: PSS, pump: G1310A, autosampler: G1329A, oven: Techlab, DAD detector: G1315D, RI detector: G1362A, eluent: DMAc+0.21% LiCl, 1 ml/min, temperature: 40° C., column: PSS GRAM guard/1000/30 A).

2. Inventive Examples

2.1 I1: Synthesis and Polymerization of 4,4'-(((2,5-di-tert-butyl-1,4-phenylene)bis(oxy))bis(methylene))bis(vinylbenzene) 2

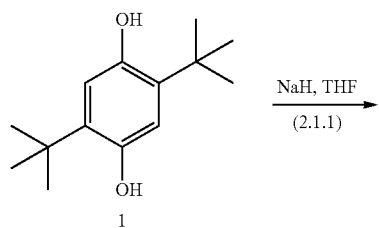

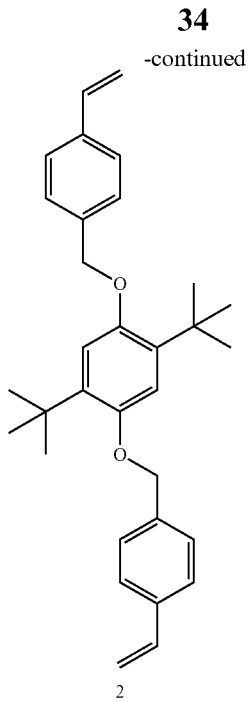

2.1.1 Synthesis of 4,4'-(((2,5-di-tert-butyl-1,4-phenylene)bis(oxy))bis(methylene))bis(vinylbenzene) 2

A 0.5 M solution of 1 (3 g, 13.5 mmol) in THF was added dropwise to an ice-cooled suspension of NaH (1.35 g, 33.7 mmol, 60% dispersion in mineral oil) in 15 mL of THF and, on completion of addition, the mixture was stirred at room temperature for 1 hour. Subsequently, 4-vinylbenzyl chloride (5.6 ml, 40 mmol) was added and the reaction mixture was stirred at 50° C. for 48 hours. The reaction was quenched with water and extracted with dichloromethane. The organic phase was dried with MgSO$_4$, the solvent was removed under reduced pressure and the residue was precipitated in hexane/CH$_2$Cl$_2$ (4:1). 3.95 g (8.7 mmol, 64%) of 2 were obtained as a white solid.

Figure 1:
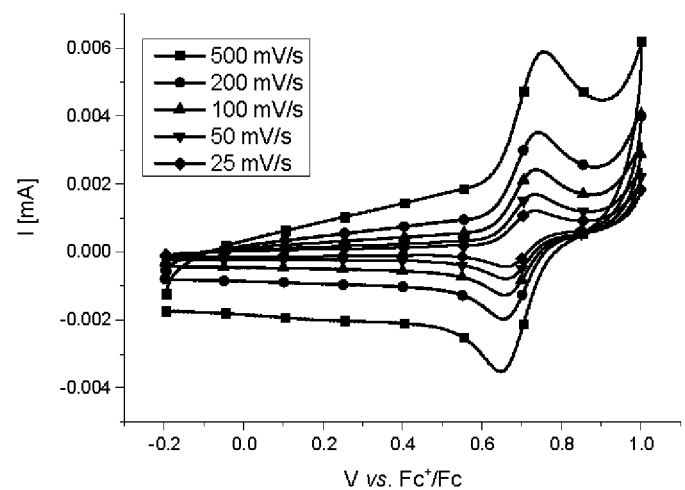
FIG. 1 (=FIG. 1) shows the cyclic voltammogram of 2 (1 mmolar in $CH_2Cl_2$ with 0.1 M $TBAPF_6$) at various scan rates (reported in mV/s). The x axis indicates the potential V, the y axis the current in mA.

FIG. 1 (=FIG. 1) shows the cyclic voltammogram of 2 (1 mmolar in $CH_2Cl_2$ with 0.1 M $TBAPF_6$) at various scan rates.

$^1$H NMR ($CDCl_3$, 300 MHz, ppm): δ 7.42 (8H), 6.90 (s, 2H), 6.72 (dd, 2H), 5.76 (d, 2H), 5.24 (d, 2H), 5.06 (s, 4H), 1.36 (s, 18H).

2.1.2 Polymerization of 4,4'-(((2,5-di-tert-butyl-1,4-phenylene)bis(oxy))bis(methylene))bis(vinylbenzene) 2 to Give 3

A 0.5 M solution of 2 (100 mg, 0.22 mmol) in dry DMF and AIBN (1.80 mg, 0.011 mmol) was degassed with argon for 90 min. The degassed solution was stirred at 80° C. for 16 hours. The polymer was precipitated and washed in methanol. This gave 79 mg (0.17 mmol, 78.3%) of 3 as a white solid.

2.2 I2: Synthesis and Polymerization of 1,4-di-tert-butyl-2-methoxy-5-((4-vinylbenzyl)ox)benzene 5

2.2.1 Synthesis of 1,4-di-tert-butyl-2-methoxy-5-((4-vinylbenzyl)oxy)benzene 5

A 0.4 M solution of 4 (2 g, 8.5 mmol) in THF was added dropwise to an ice-cooled suspension of NaH (507 mg, 12.7 mmol, 60% dispersion in mineral oil) in 10 mL of THF and, on completion of addition, the mixture was stirred at room temperature for another 2 hours. Subsequently, 4-vinylbenzyl chloride (3.6 ml, 25.4 mmol) was added and the reaction mixture was stirred at 50° C. for 48 hours. The reaction was quenched with water and extracted with dichloromethane. The organic phase was dried with $MgSO_4$, the solvent and 4-vinylbenzyl chloride were removed under reduced pressure and the residue was purified by means of column chromatography (silica gel, toluene/hexane 1:1). 1.9 g (5.4 mmol, 63.5%) of 5 were obtained as a white solid.

Figure 2:
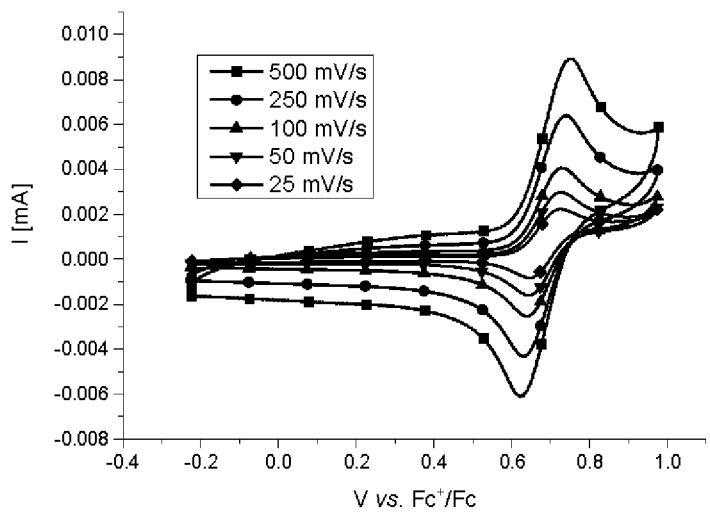
FIG. 2 (=FIG. 2) shows the cyclic voltammogram of 5 in $CH_2Cl_2$ (1 mmolar in $CH_2Cl_2$ with 0.1 M $TBAClO_4$) at various scan rates (reported in mV/s). The x axis indicates the potential V, the y axis the current in mA.

FIG. 2 (=FIG. 2) shows the cyclic voltammogram of 5 in $CH_2Cl_2$ (1 mmolar in $CH_2Cl_2$ with 0.1 M $TBAClO_4$) at various scan rates.

$^1$H NMR ($CDCl_3$, 300 MHz, ppm): δ 7.45 (4H), 6.90 (2H), 6.75 (dd, 1H), 5.78 (d, 1H), 5.27 (d, 1H), 5.08 (s, 2H), 3.83 (s, 3H), 1.39 (d, 18H).

2.2.2 Polymerization of 1,4-di-tert-butyl-2-methoxy-5-((4-vinylbenzyl)oxy)benzene 5 to give 6

A 1.0 M solution of 5 (100 mg, 0.28 mmol) in dry DMF and AIBN (1.32 mg, 0.014 mmol) was degassed with argon for 90 min. The degassed solution was stirred at 80° C. for 16 hours. The polymer was precipitated in methanol. This gave 52 mg (0.15 mmol, 51.7%) of 6 as a white solid.

2.3 I3: Synthesis and Polymerization of 1,4-di-tert-butyl-2-methoxy-5-(ethenyloxy)benzene 7

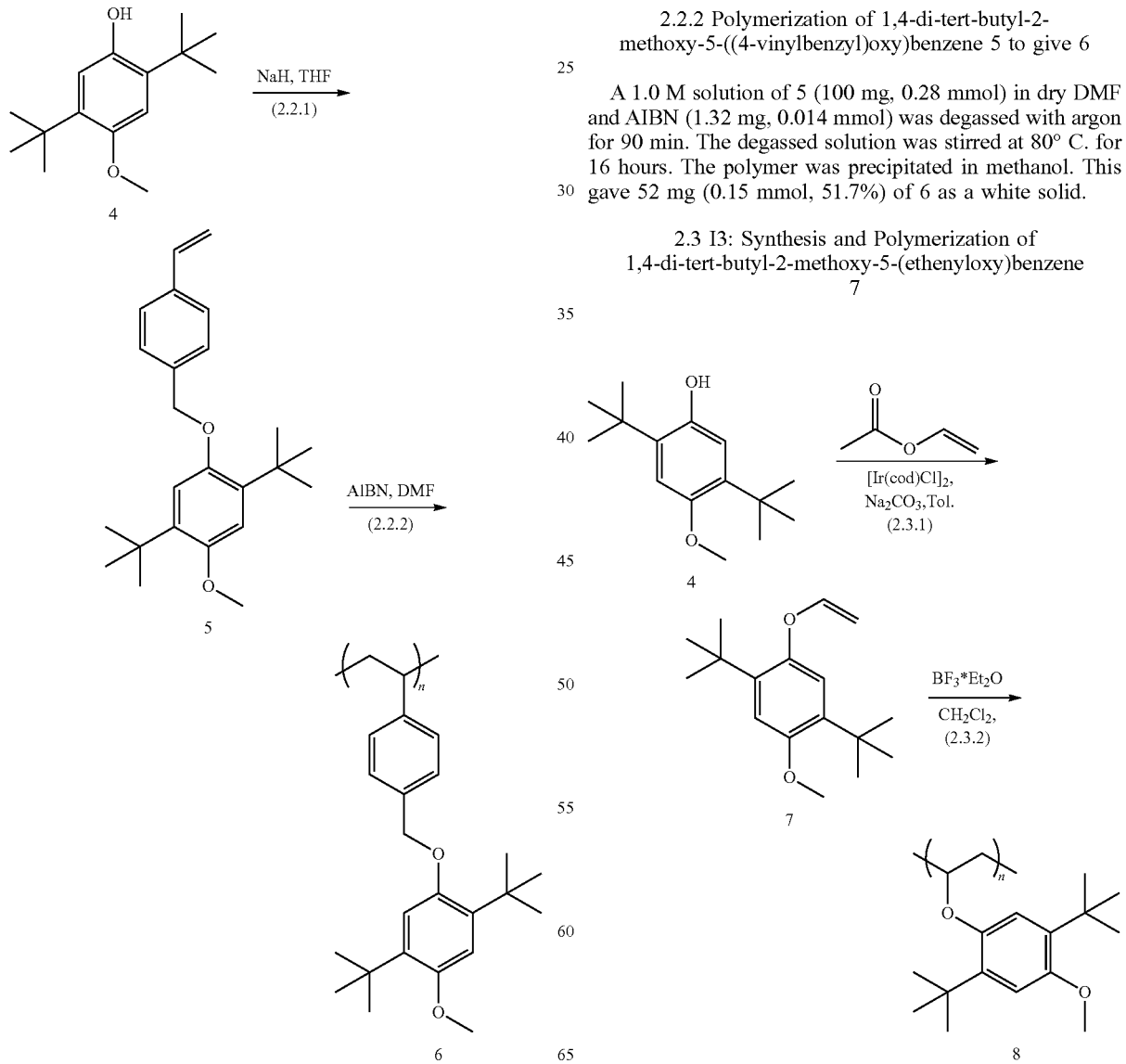

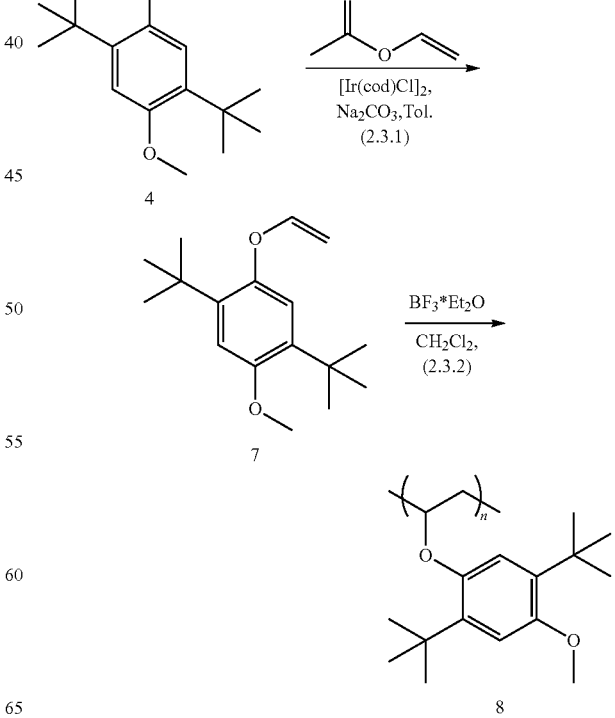

2.3.1 Synthesis of 1,4-di-tert-butyl-2-methoxy-5-(ethenyloxy)benzene 7

2,5-Di-tert-butyl-4-methoxyphenol 4 (591 mg, 2.5 mmol), Na$_2$CO$_3$ (318 mg, 3 mmol) and [Ir(cod)Cl]$_2$ (16.8 mg, 0.025 mmol) were freed of traces of water and air in a Schlenk flask. Subsequently, dry toluene (2.5 ml) and vinyl acetate (0.29 ml, 3.125 mmol) were added. The solution was stirred at 90° C. under argon for 24 hours. The reaction solution was purified by column chromatography on silica with toluene as eluent. 202 mg (31%) of 7 were obtained as a yellowish solid.

$^1$H NMR (CDCl$_3$, 300 MHz, ppm): δ 6.95 (s, 1H), 6.91 (s, 1H), 6.60 (dd, 1H), 4.72 (d, 1H), 4.38 (d, 1H), 3.91 (s, 3H), 1.46 (s, 9H), 1.44 (s, 9H).

2.3.2 Polymerization of 1,4-di-tert-butyl-2-methoxy-5-(ethenyloxy)benzene 7 to give 8

1,4-Di-tert-butyl-2-methoxy-5-(ethenyloxy)benzene 7 (65.6 mg, 0.25 mmol) under an argon atmosphere were dissolved in 0.125 ml of dry dichloromethane and cooled to −78'C. Subsequently, 5 mol % of BF$_3$ etherate (1.6 μl, 12.5 μmol) was added. The reaction mixture was stirred for 24 h, in the course of which it was warmed to room temperature. The gel-like solution was diluted with 1 ml of dichloromethane and precipitated in methanol. The solids were removed by centrifugation, washed with methanol and dried under reduced pressure. 38.8 mg (59% yield) of 8 were obtained in the form of a white powder.

3. Comparative Examples

3.1 C1: Synthesis and Polymerization of ((2,5-di-tert-butyl-1,4-phenylene)bis(oxy))bis(propane-3,1-diyl)bis(2-methyl acrylate) 12

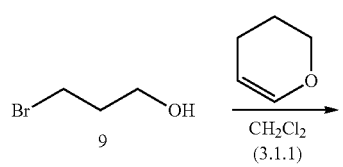

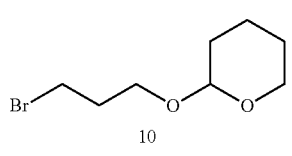

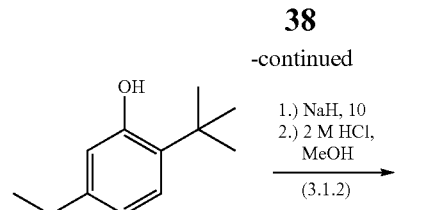

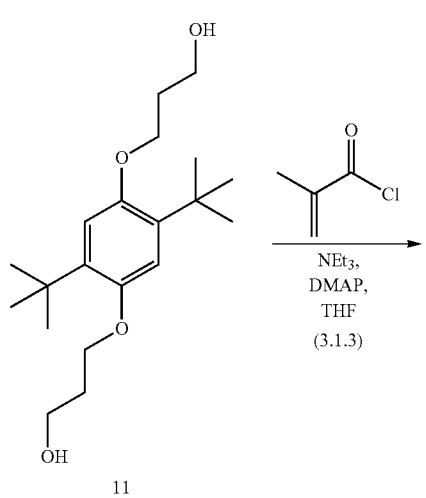

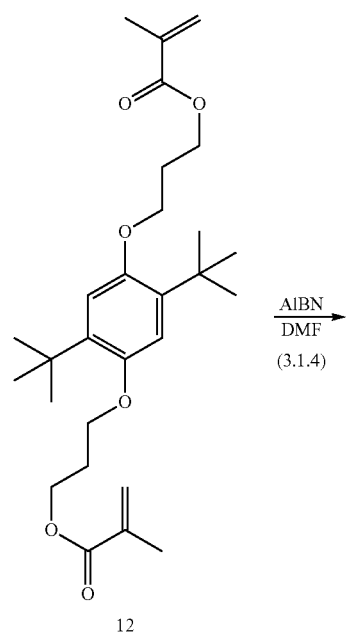

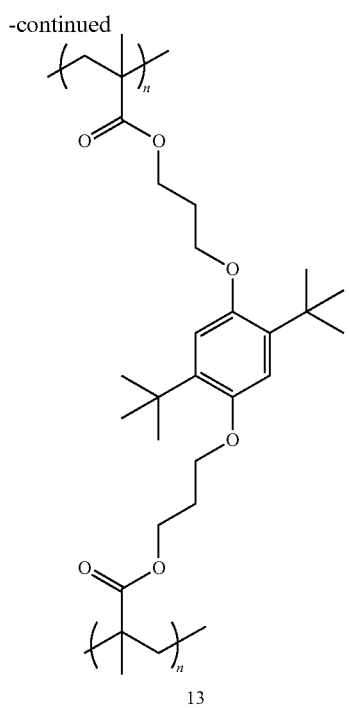

13

3.1.1 Synthesis of 2-(3-bromopropoxy)tetrahydro-2H-pyran 10

Stirred into a 0.5 M solution of 1-bromo-3-hydroxypropane 9 (10 g, 72 mmol) in CH$_2$Cl$_2$ were p-toluenesulphonic acid hydrate (1.37 g, 7.2 mmol) and dihydropyran (9.8 ml, 107.9 mmol), and the mixture was stirred at room temperature for 16 hours. The reaction was extracted with water. The organic phase was dried with MgSO$_4$, the solvent was removed under reduced pressure and the residue was purified by means of vacuum distillation. 12.2 g (54.7 mmol, 76%) of 10 were obtained as a colourless oil.

$^1$H NMR (CDCl$_3$, 300 MHz, ppm): 54.52 (s, 1H), 3.78 (m, 2H), 3.46 (m, 4H), 2.05 (m, 2H), 1.68 (m, 2H), 1.46 (m, 4H).

3.1.2 Synthesis of 3,3'-((2,5-di-tert-butyl-1,4-phenylene)bis(oxy))bis(propan-1-ol) 11

To a 0.9 M solution of 1 (1 g, 4.5 mmol) in THF was added dropwise an ice-cooled suspension of NaH (450 mg, 11.2 mmol, 60% dispersion in mineral oil) in 10 mL of THF and, on completion of addition, the mixture was stirred at room temperature for another 2 hours. Subsequently, 10 (5.02 g, 22.5 mmol) was added and the reaction mixture was stirred at 50° C. for 24 hours. The reaction was quenched with water and extracted with dichloromethane. The organic phase was dried with MgSO$_4$ and the solvent was removed under reduced pressure. Without further purification, the residue was taken up in 50 ml of methanol, and 20 ml of 2 M HCl were added. After detachment of the protecting group (monitoring by TLC), the product was extracted with dichloromethane and dried over MgSO$_4$, and the solvent was removed under reduced pressure. The residue was purified by means of column chromatography (silica gel, hexane/ethyl acetate, 1:1). 853 mg (2.5 mmol, 56%) of 11 were obtained as a white solid.

$^1$H NMR (CDCl$_3$, 300 MHz, ppm): δ 6.85 (s, 2H), 4.10 (t, 4H), 3.92 (t, 4H), 2.09 (m, 4H), 1.37 (s, 18H).

3.1.3 Synthesis of ((2, 5-di-tert-butyl-1,4-phenylene)bis(oxy))bis(propane-3,1-diyl)-bis(2-methyl acrylate) 12

11 (505 mg, 1.5 mmol) and DMAP (18 mg, 0.15 mmol) were inertized 10 ml of dry THF, triethylamine (820 μl, 5.9 mmol) and methacryloyl chloride (570 μl, 5.9 mmol) were added while cooling and the mixture was stirred at room temperature for 16 hours. The reaction was quenched with water and extracted with dichloromethane. The organic phase was dried with MgSO$_4$ and the solvent was removed under reduced pressure. The residue was purified by means of column chromatography (silica gel, hexane/ethyl acetate, 4:1). 565 mg (1.2 mmol, 80.6%) of 12 were obtained as a white solid.

$^1$H NMR (CDCl$_3$, 300 MHz, ppm): δ 6.83 (s, 2H), 6.12 (s, 2H), 5.56 (s, 2H), 4.39 (t, 4H), 4.07 (t, 4H), 2.21 (m, 4H), 1.95 (s, 6H), 1.37 (s, 18H).

3.1.4 Polymerization of ((2,5-di-tert-butyl-1,4-phenylene)bis(oxy))bis(propane-3,1-diyl)bis(2-methyl acrylate) 12 to Give 13

A 0.5 M solution of 12 (100 mg, 0.210 mmol) in dry DMF and AIBN (1.72 mg, 0.011 mmol) was degassed with argon for 90 min. The degassed solution was stirred at 80° C. for 16 hours. The polymer was precipitated and washed in methanol. This gave 65 mg (0.178 mmol, 84.3%) of 13 as a white solid.

3.2 C2: Synthesis and Polymerization of 3-(2,5-di-tert-butyl-4-methoxyphenoxy)propyl methacrylate 15

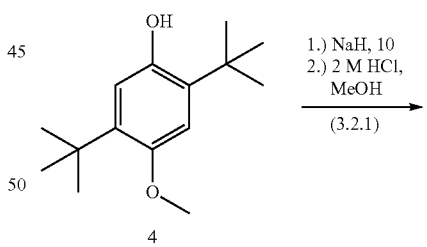

4

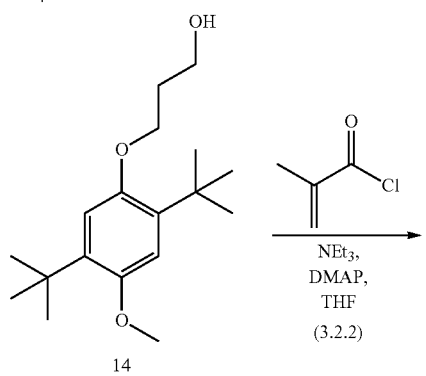

14

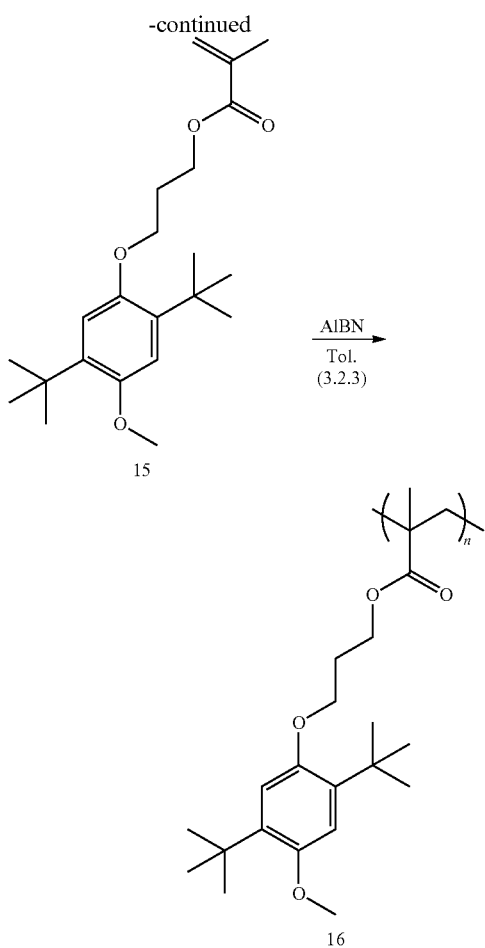

3.2.1 Synthesis of 3-(2,5-di-tert-butyl-4-methoxyphenoxy)propan-1-ol 14

A 0.8 M solution of 4 (2 g, 8.5 mmol) in THF was added dropwise to an ice-cooled suspension of NaH (507 mg, 12.7 mmol, 60% dispersion in mineral oil) in 10 mL of THF and, on completion of addition, the mixture was stirred at room temperature for another 2 hours. Subsequently, 10 (5.66 g, 25.4 mmol) was added and the reaction mixture was stirred at 50° C. for 48 hours. The reaction was quenched with water and extracted with dichloromethane. The organic phase was dried with MgSO$_4$ and the solvent was removed under reduced pressure. The residue was taken up in 50 ml of methanol, and 20 ml of 2 M HCl were added. After detachment of the protecting group, the product was extracted with dichloromethane and dried over MgSO$_4$, and the solvent was removed under reduced pressure. The residue was purified by means of gel filtration (silica gel, hexane/ethyl acetate, 4:1). 1.62 g (5.5 mmol, 65%) of 14 were obtained as a white solid.

$^1$H NMR (CDCl$_3$, 300 MHz, ppm): δ 6.84 (2H), 4.11 (t, 2H), 3.92 (t, 2H), 3.81 (s, 3H), 2.09 (m, 2H), 1.37 (18H).

3.2.2 Synthesis of 3-(2,5-di-tert-butyl-4-methoxyphenoxy)propyl methacrylate 15

14 (500 mg, 1.7 mmol) and DMAP (20.8 mg, 0.17 mmol) were inertized. 10 ml of dry THF, triethylamine (940 µl, 6.8 mmol) and methacryloyl chloride (660 µl, 6.8 mmol) were added while cooling and the mixture was stirred at room temperature for 16 hours. The reaction was quenched with water and extracted with dichloromethane. The organic phase was dried with MgSO$_4$ and the solvent was removed under reduced pressure. The residue was purified by means of column chromatography (silica gel, hexane/ethyl acetate, 4:1). 545 mg (1.5 mmol, 88.5%) of 15 were obtained as a white solid.

$^1$H NMR (CDCl$_3$, 300 MHz, ppm): δ 6.83 (2H), 6.12 (s, 1H), 5.56 (s, 1H), 4.39 (t, 2H), 4.07 (t, 2H), 3.80 (s, 3H), 2.21 (m, 2H), 1.95 (s, 3H), 1.36 (18H).

3.2.3 Polymerization of 3-(2,5-di-tert-butyl-4-methoxyphenoxy)propyl methacrylate 15 to give 16

A 0.5 M solution of 15 (100 mg, 0.275 mmol) in dry toluene and AIBN (1.72 mg, 0.13 mmol) was degassed with argon for 90 min. The degassed solution was stirred at 80° C. for 16 hours. The polymer was precipitated in methanol. This gave 65 mg (0.18 mmol, 64.5%) of 16 as a white solid.

4. Production of the Electrodes

4.1 Production of an Electrode Comprising 6 (Inventive Example)

6 (prepared as described in section 2.2.2) was processed in a mortar to give a fine powder. Subsequently added to 5 mg of 6 and 5 mg of poly(vinylidene fluoride) (PVDF; Sigma Aldrich as binder additive) was 0.5 ml of NMP (N-methyl-2-pyrrolidone), and the mixture was stirred for 4 h. This solution was added to 40 mg of Super P® (carbon particles from Sigma-Aldrich, as conductivity additive) and the mixture was mixed in a mortar for ten minutes until a homogeneous paste formed. This paste was applied to an aluminium foil (15 µm, MIT Corporation). The resultant electrode was dried at 45° C. under reduced pressure for 16 hours. The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC/DMC 3/7, 0.5 M LiClO$_4$) and covered with the lid before being sealed with an electrical compression machine (MIT Corporation MSK-100D).

In the first discharge cycle, the battery showed a capacity of 67 mAh/g (88% of the theoretically possible capacity); after 10 charge/discharge cycles (charging rate 1 C), the battery shows a capacity of 50 mAh/g (FIG. 3=FIG. 3).

4.2 Production of an Electrode Comprising 13 (Comparative Example)

13 (prepared as described in section 3.1.4) was processed in a mortar to give a fine powder. Subsequently added to 15 mg of 13 and 5 mg of poly(vinylidene fluoride) (PVDF; Sigma Aldrich as binder additive) was 0.5 ml of NMP (N-methyl-2-pyrrolidone), and the mixture was stirred for 4 h. This solution was added to 30 mg of Super P® (Sigma-Aldrich, as conductivity additive) and the mixture was mixed in a mortar for ten minutes until a homogeneous paste formed. This paste was applied to an aluminium foil (15 μm, MIT Corporation). The resultant electrode was dried at 45° C. under reduced pressure for 16 hours. The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC/DMC 3/7, 0.5 M LiClO$_4$) and covered with the lid before being sealed with an electrical compression machine (MIT Corporation MSK-100D).

In the first discharge cycle, the battery showed a capacity of 34 mAh/g (60% of the theoretically possible capacity); after 10 charge/discharge cycles (charging rate 1 C), the battery shows a capacity of 24 mAh/g (FIG. 4=FIG. 4).

4.3 Production of an Electrode Comprising 16 (Comparative Example)

16 (prepared as described in section 3.2.3) was processed in a mortar to give a fine powder. Subsequently added to 5 mg of 16 and 5 mg of poly(vinylidene fluoride) (PVDF; Sigma Aldrich as binder additive) was 0.5 ml of NMP (N-methyl-2-pyrrolidone), and the mixture was stirred for 4 h. This solution was added to 40 mg of Super P® (Sigma-Aldrich, as conductivity additive) and the mixture was mixed in a mortar for ten minutes until a homogeneous paste formed. This paste was applied to an aluminium foil (15 μm, MIT Corporation). The resultant electrode was dried at 45° C. under reduced pressure for 16 hours. The proportion of the active material on the electrodes was determined on the basis of the masses of dried electrodes. The button cells (2032 type) were constructed under an argon atmosphere. Suitable electrodes were punched out with the aid of an MIT Corporation Precision Disc Cutter (diameter 15 mm). The electrode being used as cathode was positioned at the base of the button cell and separated from the lithium anode with the aid of a porous polypropylene membrane (Celgard, MIT Corporation). Subsequently positioned atop the lithium anode were a stainless steel weight (diameter: 15.5 mm, thickness: 0.3 mm, MIT Corporation) and a stainless steel spring (diameter: 14.5 mm, thickness: 5 mm). The button cell was filled with electrolyte (EC/DMC 3/7, 0.5 M LiClO$_4$) and covered with the lid before being sealed with an electrical compression machine (MIT Corporation MSK-100D).

In the first discharge cycle, the battery showed a capacity of 55 mAh/g (81% of the theoretically possible capacity); after 10 charge/discharge cycles (rate 1 C), the battery shows a capacity of 41 mAh/g (FIG. 5=FIG. 5).

5. Results

The batteries which were obtained with electrodes made from inventive polymers (section 4.1, FIG. 3) show a discharge capacity after the first charge/discharge cycle of 67 mAh/g and a discharge capacity of 50 mAh/g after 10 discharge cycles. This is much higher than the discharge capacity which is achieved with batteries made from electrodes made from prior art polymers, namely 34 mAh/g after the 1st charge/discharge cycle and 24 mAh/g after the 10th charge/discharge cycle with a battery according to section 4.2, and 55 mAh/g after the 1st charge/discharge cycle and 41 mAh/g after the 10th charge/discharge cycle with a battery according to section 4.3. The polymer according to the invention therefore enables batteries having both higher discharge voltage and higher discharge capacity even after several charge/discharge cycles. In addition, it was possible to prepare the polymers according to the invention in a much less resource-intensive manner.

The invention claimed is:

1. A redox-active electrode material, comprising:
   a conductivity additive selected from the group consisting of carbon materials and electrically conductive polymers;
   a binder additive selected from the group consisting of polytetrafluoroethylene, polyvinylidene fluoride, polyhexafluoropropylene, polyvinyl chloride, polycarbonate, polystyrene, polyacrylates, polymethacrylates, poly sulphones, cellulose derivatives, and polyurethanes; and
   a polymer, comprising $n^1$ mutually linked repeat units of the following chemical structure (I) or $n^2$ mutually linked repeat units of the following chemical structure (II):

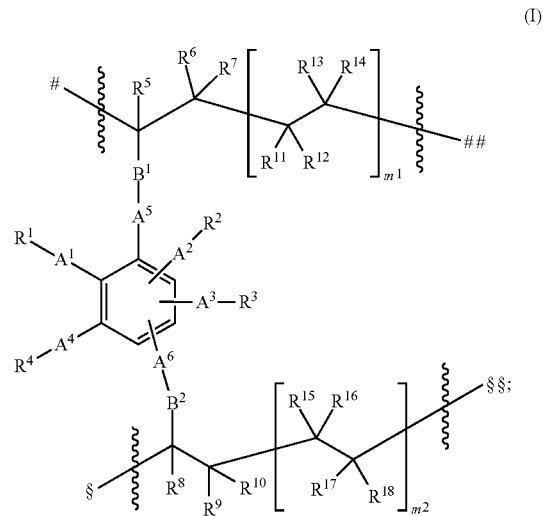

-continued (II)

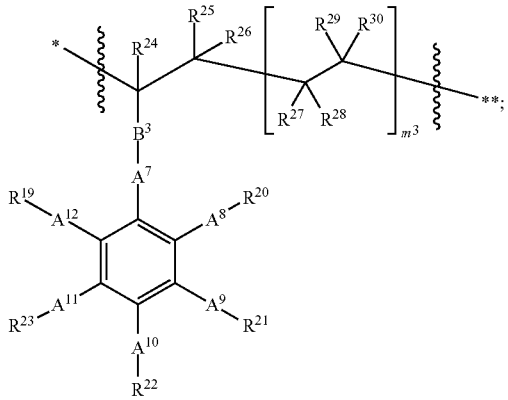

wherein
$n^1$ and $n^2$ are each independently an integer≥4,
$m^1$, $m^2$, and $m^3$ are each independently an integer≥0,
the repeat units of the chemical structure (I) within the polymer are the same or different from one another,
the repeat units of the chemical structure (II) within the polymer are the same or different from one another,
the repeat units of the chemical structure (I) within the polymer are joined to one another in such a way that the bond identified by "# #" in a particular repeat unit is joined by the bond identified by "#" in the adjacent repeat unit and the bond identified by "§§ " in a particular repeat unit is joined by the bond identified by "§ " in the adjacent repeat unit,
the repeat units of the chemical structure (II) within the polymer are joined to one another in such a way that the bond identified by "*" in a particular repeat unit is joined by the bond identified by "**" in the adjacent repeat unit,
the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, and $R^{30}$ radicals are each independently selected from the group consisting of
hydrogen, (hetero)aromatic radical, and
aliphatic radical optionally substituted by at least one group selected from nitro group, —$NH_2$, —CN, —SH, —OH and halogen and optionally having at least one group selected from ether, thioether, amino ether, carbonyl group, carboxylic ester group, carboxamide group, sulphonic ester group and phosphoric ester,
at least two of $A^1$, $A^2$, $A^3$, $A^4$, $A^5$, and $A^6$ are each an oxygen or sulphur atom and the others of $A^1$, $A^2$, $A^3$, $A^4$, $A^5$, and $A^6$ are each a direct bond,
at least two of $A^7$, $A^8$, $A^9$, $A^{10}$, $A^{11}$ and $A^{12}$ are each an oxygen or sulphur atom and the others of $A^7$, $A^8$, $A^9$, $A^{10}$, $A^{11}$ and $A^{12}$ are each a direct bond,
at least two radicals in ortho positions to one another among the $R^1$, $R^2$, $R^3$, $R^4$ radicals and/or at least two radicals in ortho positions to one another among the $R^{19}$, $R^{20}$, $R^{21}$, $R^{22}$, $R^{23}$ radicals may each also be bridged by at least one (hetero)aromatic ring or aliphatic ring optionally substituted by at least one group selected from nitro group, —$NH_2$, —CN, —SH, —OH, halogen and alkyl group and optionally having at least one group selected from ether, thioether, amino ether, carbonyl group, carboxylic ester group, carboxamide group, sulphonic ester group and phosphoric ester,
the $R^1$ radical in the case that $A^1$=direct bond, the $R^2$ radical in the case that $A^2$=direct bond, the $R^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ radicals may each also be selected from the group consisting of
nitro group, —CN, —F, —Cl, —Br, —I, —$COOR^{36}$, —C(=O)$NHR^{37}$, and —$NR^{38}R^{39}$, where $R^{36}$, $R^{37}$, $R^{38}$, and $R^{39}$ are each independently selected from the group consisting of hydrogen, (hetero)aromatic radical, and aliphatic radical optionally substituted by at least one group selected from nitro group, —$NH_2$, —CN, —SH, —OH, and halogen and optionally having at least one group selected from ether, thioether, amino ether, carbonyl group, carboxylic ester group, carboxamide group, sulphonic ester group, and phosphoric ester,
and wherein the $R^5$, $R^6$, $R^7$, $R^9$, $R^{10}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ radicals may independently also be a radical of the formula —O—$R^{40}$ where $R^{40}$ is an aliphatic radical optionally substituted by at least one group selected from nitro group, —$NH_2$, —CN, —SH, —OH, and halogen and optionally having at least one group selected from the group consisting of ether, thioether, amino ether, carbonyl group, carboxylic ester group, carboxamide group, sulphonic ester group, and phosphoric ester,
$B^1$, $B^2$, and $B^3$ are each independently selected from the group consisting of
&—$(CH_2)_{p1}$—&& where p1 is an integer from 1 to 4, and where at least one —$CH_2$— group may also be replaced by —C(=O)—,
&—$(CH_2)_{r1}$—$B^5$—$(CH_2)_{r2}$—&& where $B^5$ is a (hetero)aromatic divalent 6-membered ring, 3-membered ring or 5-membered ring and r1, r2 are each 0 or 1, where r1+r2≤1,
&—$(CH_2)_{q1}$—$B^6$—$(CH_2)_{q2}$—&& with $B^6$=O, S, NH; q1=0, 1, 2 and q2=1, 2, 3 where q1+q2≤3 and where one —$CH_2$— group may also be replaced by —C(=O)—, and
&—O—C(=O)—NH—$CH_2$—&&,
$B^1$, in the case that $A^5$=direct bond, $B^2$ in the case that $A^6$=direct bond, $B^3$ in the case that $A^7$=direct bond, may each independently also be selected from the group consisting of
&—$(CH_2)_5$—&& where at least one —$CH_2$— group may also be replaced by —C(=O)—,
&—$(CH_2)_{v1}$—$B^7$—$(CH_2)_{v2}$—&& with $B^7$=O, S, NH; v1=0, 1, 2, 3 and v2=1, 2, 3, 4, where v1+v2=4 and where one —$CH_2$— group may also be replaced by —C(=O)—,
&—$(CH_2)_{t1}$—$B^8$—$(CH_2)_{t2}$—&& where $B^8$ is a (hetero)aromatic divalent 3-membered ring, 5-membered ring or 6-membered ring and t1, t2 are each 0 or 2, where t1+t2≤2,
&—$CH_2$—O—C(=O)—NH—$CH_2$—&&, &—O—C(=O)—NH—&&, &—$CH_2$—O—C(=O)—NH—&&, and
&—$CH_2$—$CH_2$—O—C(=O)—NH—&&, &—O—C(=O)—NH—$CH_2$—$CH_2$—&&, wherein
B$^1$, in the case that A$^5$=O or S, B$^2$ in the case that A$^6$=O or S, B$^3$ in the case that A$^7$=O or S, may in each case also be a direct bond,
in the B$^1$, B$^2$, and B$^3$ radicals, at least one hydrogen atom bonded to a carbon atom or nitrogen atom may be replaced by a halogen atom or an alkyl group,
"&&" for B$^1$ denotes the bond pointing toward A$^5$, for B$^2$ the bond pointing toward A$^6$, and for B$^3$ the bond pointing toward A$^7$,
and "&" for B$^1$ denotes the bond pointing toward R$^5$, for B$^2$ the bond pointing toward R$^8$, and for B$^3$ the bond pointing toward R$^{24}$.

2. The redox-active electrode material according to claim 1, wherein the polymer comprises n$^1$ mutually linked repeat units of the chemical structure (I) or n$^2$ mutually linked repeat units of the chemical structure (II)

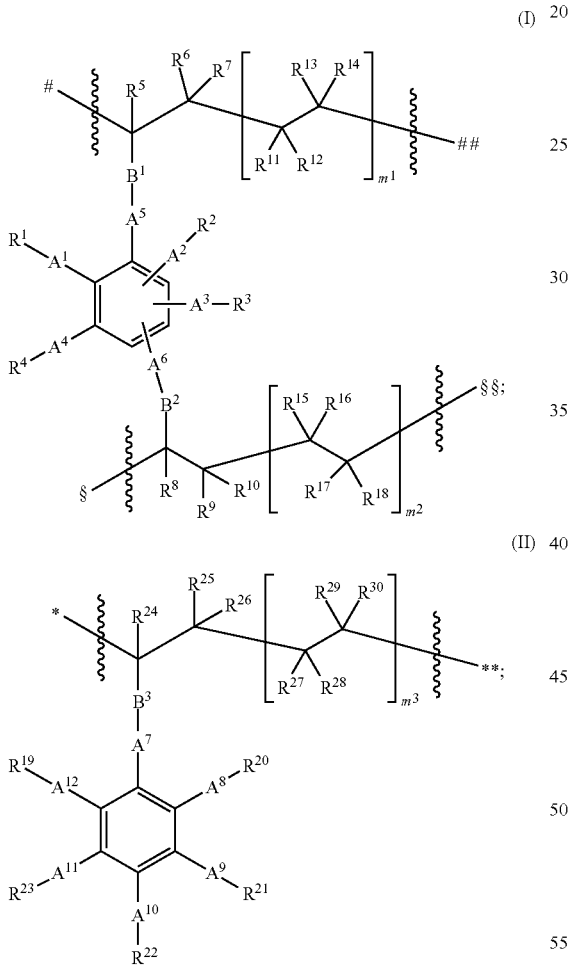

wherein
n$^1$ and n$^2$ are each independently an integer≥4,
m$^1$, m$^2$, and m$^3$ are each independently an integer≥0,
the repeat units of the chemical structure (I) within the polymer are the same or different from one another,
the repeat units of the chemical structure (II) within the polymer are the same or different from one another,
the repeat units of the chemical structure (I) within the polymer are joined to one another in such a way that the bond identified by "# #" in a particular repeat unit is joined by the bond identified by "#" in the adjacent repeat unit and the bond identified by "§§ " in a particular repeat unit is joined by the bond identified by "§ " in the adjacent repeat unit,
the repeat units of the chemical structure (II) within the polymer are joined to one another in such a way that the bond identified by "*" in a particular repeat unit is joined by the bond identified by "**" in the adjacent repeat unit,
the R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, and R$^{30}$ radicals are each independently selected from the group consisting of
hydrogen, phenyl, benzyl, and
aliphatic radical optionally substituted by at least one group selected from nitro group, —NH$_2$, —CN, —SH, —OH, and halogen and optionally having at least one group selected from ether, thioether, amino ether, carbonyl group, carboxylic ester group, carboxamide group, sulphonic ester group, and phosphoric ester,
R$^{11}$, R$^{13}$, R$^{15}$, and R$^{17}$ radicals may each independently also be a group of the general structure (III):

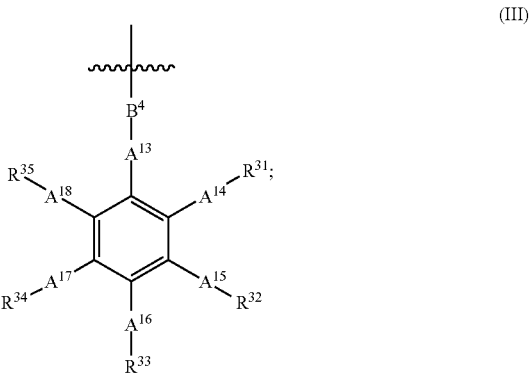

wherein the R$^{31}$, R$^{32}$, R$^{33}$, R$^{34}$, and R$^{35}$ radicals may independently be as defined for
at least two of A$^1$, A$^2$, A$^3$, A$^4$, A$^5$, and A$^6$ are each an oxygen or sulphur atom and the others of A$^1$, A$^2$, A$^3$, A$^4$, A$^5$, A$^6$ are each a direct bond,
at least two of A$^7$, A$^8$, A$^9$, A$^{10}$, A$^{11}$, and A$^{12}$ are each an oxygen or sulphur atom and the others of A$^7$, A$^8$, A$^9$, A$^{10}$, A$^{11}$, A$^{12}$ are each a direct bond,
at least two of A$^{13}$, A$^{14}$, A$^{15}$, A$^{16}$, A$^{17}$, and A$^{18}$ are each an oxygen or sulphur atom and the others of A$^{13}$, A$^{14}$, A$^{15}$, A$^{16}$, A$^{17}$, and A$^{18}$ are each a direct bond,
and wherein at least two radicals in ortho positions to one another among the R$^1$, R$^2$, R$^3$, R$^4$ radicals and/or at least two radicals in ortho positions to one another among the R$^{19}$, R$^{20}$, R$^{21}$, R$^{22}$, R$^{23}$ radicals and/or at least two radicals in ortho positions to one another among the R$^{31}$, R$^{32}$, R$^{33}$, R$^{34}$, R$^{35}$ radicals may each also be bridged by at least one (hetero)aromatic ring or aliphatic ring optionally substituted by at least one group selected from nitro group, —NH$_2$, —CN, —SH, —OH, halogen, and alkyl group and optionally having at least one group selected from ether, thioether, amino ether, carbonyl group, carboxylic ester group, carboxamide group, sulphonic ester group, and phosphoric ester,
the R$^1$ radical in the case that A$^1$=direct bond, the R$^2$ radical in the case that A$^2$=direct bond, the R$^3$ radical in the case that $A^3$=direct bond, the $R^4$ radical in the case that $A^4$=direct bond, the $R^{19}$ radical in the case that $A^{12}$=direct bond, the $R^{20}$ radical in the case that $A^8$=direct bond, the $R^{21}$ radical in the case that $A^9$=direct bond, the $R^{22}$ radical in the case that $A^{10}$=direct bond, the $R^{23}$ radical in the case that $A^{11}$=direct bond, the $R^{31}$ radical in the case that $A^{14}$=direct bond, the $R^{32}$ radical in the case that $A^{15}$=direct bond, the $R^{33}$ radical in the case that $A^{16}$=direct bond, the $R^{34}$ radical in the case that $A^{17}$=direct bond, the $R^{35}$ radical in the case that $A^{18}$=direct bond and the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ radicals may each also be selected from the group consisting of nitro group, —CN, —F, —Cl, —Br, —I, —COOR$^{36}$, —C(=O)NHR$^{37}$, and —NR$^{38}$R$^{39}$, where $R^{36}$, $R^{37}$, $R^{38}$, $R^{39}$ are each independently selected from the group consisting of hydrogen, (hetero)aromatic radical, and aliphatic radical optionally substituted by at least one group selected from nitro group, —NH$_2$, —CN, —SH, —OH, and halogen and optionally having at least one group selected from ether, thioether, amino ether, carbonyl group, carboxylic ester group, carboxamide group, sulphonic ester group, and phosphoric ester, wherein the $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ radicals may independently also be a radical of the formula —O—R$^{40}$ where $R^{40}$ is an aliphatic radical optionally substituted by at least one group selected from nitro group, —NH$_2$, —CN, —SH, —OH, and halogen and optionally having at least one group selected from ether, thioether, amino ether, carbonyl group, carboxylic ester group, carboxamide group, sulphonic ester group and phosphoric ester, $B^1$, $B^2$, $B^3$, and $B^4$ are each independently selected from the group consisting of &—(CH$_2$)$_{p1}$—&& where p1 is an integer from 1 to 4, and where at least one —CH$_2$— group may also be replaced by —C(=O)—, and &—(CH$_2$)$_{r1}$—B$^5$—(CH$_2$)$_{r2}$—&& where B' is a (hetero)aromatic divalent 6-membered ring, 3-membered ring or 5-membered ring and r1, r2 are each 0 or 1, where r1+r2≤1, &—(CH$_2$)$_{q1}$—B$^6$—(CH$_2$)$_{q2}$—&& with B$^6$=O, S, NH; q1=0, 1, 2 and q2=1, 2, 3 where q1+q2≤3 and where one —CH$_2$— group may also be replaced by —C(=O)—,

&—O—C(=O)—NH—CH$_2$—&&, $B^1$, in the case that $A^5$=direct bond, $B^2$ in the case that $A^6$=direct bond, $B^3$ in the case that $A^7$=direct bond, $B^4$ in the case that $A^{13}$=direct bond, may each independently also be selected from the group consisting of &—(CH$_2$)$_5$—&& where at least one —CH$_2$— group may also be replaced by —C(=O)—, &—(CH$_2$)$_{v1}$—B$^7$—(CH$_2$)$_{v2}$—&& with B$^7$=O, S, NH; v1=0, 1, 2, 3 and v2=1, 2, 3, 4, where v1+v2=4 and where one —CH$_2$— group may also be replaced by —C(=O)—, &—(CH$_2$)$_{t1}$—B$^8$—(CH$_2$)$_{t2}$—&& where B$^8$ is a (hetero)aromatic divalent 3-membered ring, 5-membered ring or 6-membered ring and t1, t2 are each 0 or 2, where t1+t2≤2, &—CH$_2$—O—C(=O)—NH—CH$_2$—&&, &—O—C(=O)—NH—&&, &—CH$_2$—O—C(=O)—NH—&&, and

&—CH$_2$—CH$_2$—O—C(=O)—NH—&&, &—O—C(=O)—NH—CH$_2$—CH$_2$—&&, $B^1$, in the case that $A^5$=O or S, $B^2$ in the case that $A^6$=O or S, $B^3$ in the case that $A^7$=O or S, $B^4$ in the case that $A^{13}$=O or S, may in each case also be a direct bond, in the $B^1$, $B^2$, $B^3$, and $B^4$ radicals, at least one hydrogen atom bonded to a carbon atom or nitrogen atom may be replaced by a halogen atom or an alkyl group, "&&" for $B^1$ denotes the bond pointing toward $A^5$, for $B^2$ the bond pointing toward $A^6$, for $B^3$ the bond pointing toward $A^7$, and for $B^4$ the bond pointing toward $A^{13}$, and "&" for $B^1$ denotes the bond pointing toward $R^5$, for $B^2$ the bond pointing toward $R^8$, for $B^3$ the bond pointing toward $R^{24}$, and for $B^4$ the bond pointing toward $R^{12}$ or $R^{14}$ or $R^{16}$ or $R^{18}$.

3. The redox-active electrode material according to claim 2, wherein the polymer comprises $n^1$ mutually linked repeat units of the chemical structure (I) or $n^2$ mutually linked repeat units of the chemical structure (II)

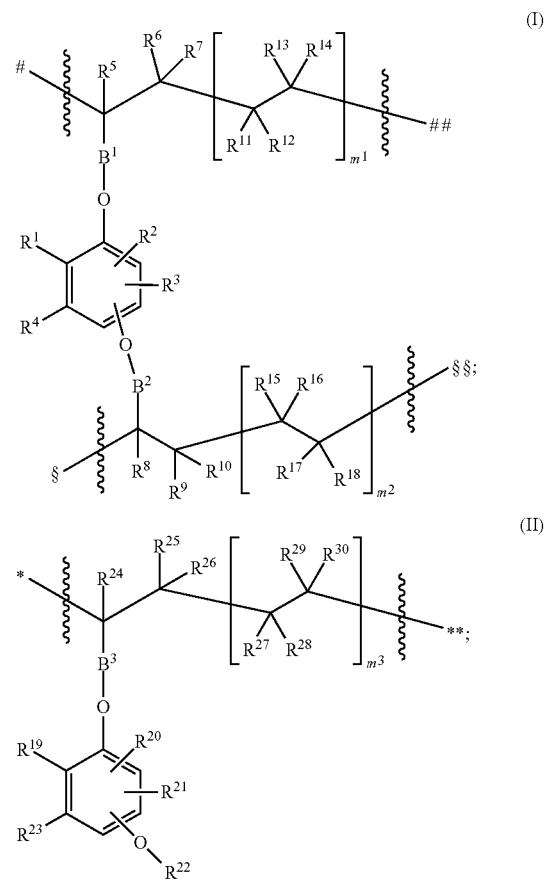

wherein $n^1$ and $n^2$ are each independently an integer≥4 and ≤5000, $m^1$, $m^2$, and $m^3$ are each independently an integer≥0 and ≤5000, the repeat units of the chemical structure (I) within the polymer are the same or different from one another, the repeat units of the chemical structure (II) within the polymer are the same or different from one another, the repeat units of the chemical structure (I) within the polymer are joined to one another in such a way that the bond identified by "# #" in a particular repeat unit is joined by the bond identified by "#" in the adjacent repeat unit and the bond identified by "§§ " in a particular repeat unit is joined by the bond identified by "§ " in the adjacent repeat unit, the repeat units of the chemical structure (II) within the polymer are joined to one another in such a way that the bond identified by "*" in a particular repeat unit is joined by the bond identified by "**" in the adjacent repeat unit, the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, and $R^{30}$ radicals are each independently selected from the group consisting of hydrogen, and alkyl group having 1 to 30 carbon atoms, $R^{22}$ is an alkyl group having 1 to 30 carbon atoms, the $R^{11}$, $R^{13}$, $R^{15}$, and $R^{17}$ radicals may each independently also be a group of the general structure (III):

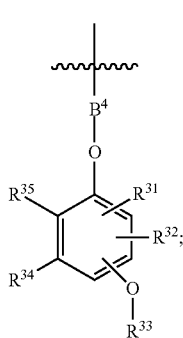

(III)

wherein the $R^{31}$, $R^{32}$, $R^{34}$, and $R^{35}$ radicals are each independently selected from the group consisting of hydrogen, and alkyl group having 1 to 30 carbon atoms, $R^{33}$ is an alkyl group having 1 to 30 carbon atoms, and wherein $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ may each also be selected from the group consisting of nitro group, —CN, —F, —Cl, —Br, —I, and —O—$R^{40}$ where $R^{40}$ is an alkyl group having 1 to 30 carbon atoms, $B^1$, $B^2$, $B^3$, $B^4$ are each independently selected from the group consisting of direct bond, &—$(CH_2)_{p1}$—&& where p1 is an integer from 1 to 4, and where at least one —$CH_2$— group may also be replaced by —C(=O)—, &—$(CH_2)_{r1}$—$B^5$—$(CH_2)_{r2}$—&& where $B^5$ is a (hetero) aromatic divalent 6-membered ring, 3-membered ring or 5-membered ring and r1, r2 are each 0 or 1, where r1+r2≤1, &—$(CH_2)_{q1}$—$B^6$—$(CH_2)_{q2}$—&& with $B^6$=O, S, NH; q1=0, 1, 2 and q2=1, 2, 3 where q1+q2≤3 and where one —$CH_2$— group may also be replaced by —C(=O)—, and

&—O—C(=O)—NH—$CH_2$—&&.

4. The redox-active electrode material according to claim 3, wherein the polymer comprises $n^1$ mutually linked repeat units of the chemical structure (I) or $n^2$ mutually linked repeat units of the chemical structure (II)

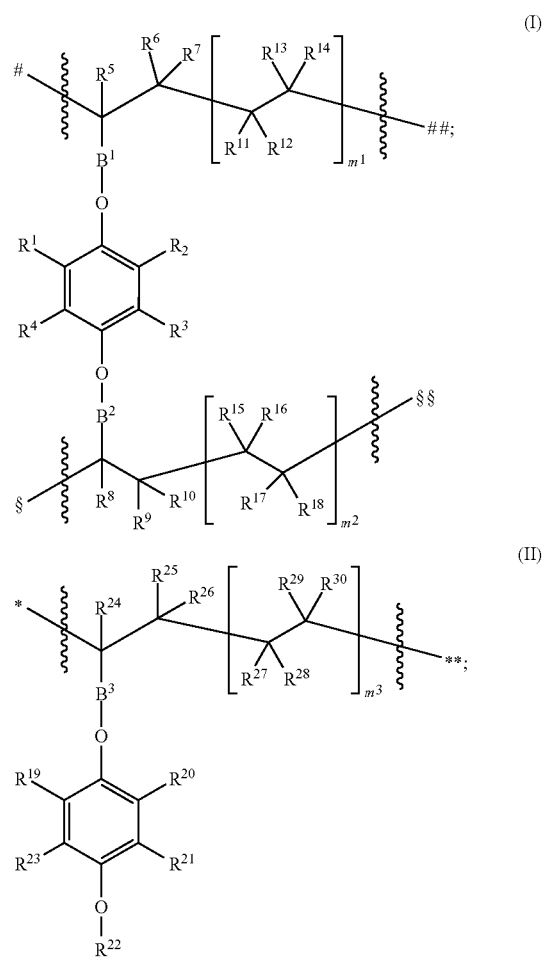

wherein $n^1$ and $n^2$ are each independently an integer≥10 and ≤1000, $m^1$, $m^2$, and $m^3$ are each independently an integer≥0 and ≤1000, the repeat units of the chemical structure (I) within the polymer are the same or different from one another, the repeat units of the chemical structure (II) within the polymer are the same or different from one another, the repeat units of the chemical structure (I) within the polymer are joined to one another in such a way that the bond identified by "# #" in a particular repeat unit is joined by the bond identified by "#" in the adjacent repeat unit and the bond identified by "§§ " in a particular repeat unit is joined by the bond identified by "§ " in the adjacent repeat unit, the repeat units of the chemical structure (II) within the polymer are joined to one another in such a way that the bond identified by "*" in a particular repeat unit is joined by the bond identified by "**" in the adjacent repeat unit, the $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{23}$, $R^{24}$, $R^{25}$, $R^{26}$, $R^{27}$, $R^{28}$, $R^{29}$, and $R^{30}$ radicals are each independently selected from the group consisting of hydrogen, and alkyl group having 1 to 8 carbon atoms, $R^{22}$ is an alkyl group having 1 to 8 carbon atoms, the $R^{11}$, $R^{13}$, $R^{15}$ and $R^{17}$ radicals may each independently also be a group of the general structure (III):

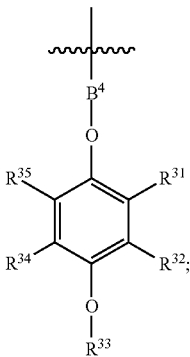

(III)

wherein the $R^{31}$, $R^{32}$, $R^{34}$, and $R^{35}$ radicals are each independently selected from the group consisting of hydrogen, and alkyl group having 1 to 8 carbon atoms, $R^{33}$ is an alkyl group having 1 to 8 carbon atoms, and wherein $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{24}$, $R^{25}$, $R^{26}$, $R^{27}$, $R^{28}$, $R^{29}$, and $R^{30}$ may each also be selected from the group consisting of nitro group, —CN, —F, —Cl, —Br, —I, and —O—$R^{40}$ where $R^{40}$ is an alkyl group having 1 to 8 carbon atoms, $B^1$, $B^2$, $B^3$, and $B^4$ are each independently selected from the group consisting of direct bond, &—$(CH_2)_{p1}$—&& where p1 is an integer from 1 to 3, &—$B^5$—$CH_2$—&& where $B^5$=phenylene, &—$(CH_2)_{q1}$—$B^6$—$(CH_2)_{q2}$—&& with $B^6$=O, S; q1=0, 1, 2 and q2=1, 2, 3 where q1+q2≤3, and

&—O—C(=O)—NH—$CH_2$—&&.

5. The redox-active electrode material according to claim 4, wherein $R^1$=$R^3$, $R^2$=$R^4$, $R^{19}$=$R^{21}$, $R^{20}$=$R^{23}$, $R^{31}$=$R^{34}$ and $R^{32}$=$R^{35}$.

6. The redox-active electrode material according to claim 5, wherein
$R^1$=$R^3$=H, $R^2$=$R^4$=alkyl group having 1 to 8 carbon atoms,
$R^{19}$=$R^{21}$=H, $R^{20}$=$R^{23}$=alkyl group having 1 to 8 carbon atoms,
$R^{31}$=$R^{34}$=H, $R^{32}$=$R^{35}$=alkyl group having 1 to 8 carbon atoms, and
$B^1$, $B^2$, $B^3$, $B^4$ are each independently selected from the group consisting of direct bond, methylene, ethylene, n-propylene, and &—$B^5$—$CH_2$—&& where $B^5$=1,4-phenylene.

7. The redox-active electrode material according to claim 6, wherein
$R^1$=$R^3$=H, $R^2$=$R^4$=alkyl group having 1 to 6 carbon atoms,
$R^{19}$=$R^{21}$=H, $R^{20}$=$R^{23}$=alkyl group having 1 to 6 carbon atoms, and
$R^{31}$=$R^{34}$=H, $R^{32}$=$R^{35}$=alkyl group having 1 to 6 carbon atoms.

8. The redox-active electrode material according to claim 7, wherein
$R^1$=$R^3$=H, $R^2$=$R^4$=tert-butyl group,
$R^{19}$=$R^{21}$=H, $R^{20}$=$R^{23}$=tert-butyl group,
$R^{31}$=$R^{34}$=H, and
$R^{32}$=$R^{35}$=tert-butyl group.

9. An electrical charge storage method, comprising employing the redox-active electrode material according to claim 1 for electrical charge storage.

10. An electrical charge storage method, comprising adding the redox-active electrode material according to claim 1 in an electrode slurry for electrical charge storage.

* * * * *